United States Patent
Suzuki et al.

(10) Patent No.: US 8,168,914 B2
(45) Date of Patent: May 1, 2012

(54) ELECTRIC-DISCHARGE-MACHINING POWER SUPPLY APPARATUS AND ELECTRIC DISCHARGE MACHINING METHOD

(75) Inventors: Satoshi Suzuki, Chiyoda-ku (JP); Kiyohito Oda, Chiyoda-ku (JP); Kazushi Nakamura, Chiyoda-ku (JP); Akihiro Goto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 903 days.

(21) Appl. No.: 11/666,432

(22) PCT Filed: Oct. 27, 2005

(86) PCT No.: PCT/JP2005/019759
§ 371 (c)(1),
(2), (4) Date: Apr. 27, 2007

(87) PCT Pub. No.: WO2006/046630
PCT Pub. Date: May 4, 2006

(65) Prior Publication Data
US 2007/0289949 A1 Dec. 20, 2007

(30) Foreign Application Priority Data
Oct. 28, 2004 (JP) .................................. 2004-313352

(51) Int. Cl.
*B23H 1/02* (2006.01)
(52) U.S. Cl. .................................. 219/69.18; 219/69.13
(58) Field of Classification Search ............... 219/69.13, 219/69.18, 69.19
See application file for complete search history.

(56) References Cited

U.S. PATENT DOCUMENTS

| | | | | | |
|---|---|---|---|---|---|
| 3,311,782 | A | * | 3/1967 | Smith et al. ................ | 219/69.13 |
| 3,688,073 | A | * | 8/1972 | Verner ........................ | 219/69.13 |
| 3,832,511 | A | * | 8/1974 | Bell et al. ................... | 219/69.18 |
| 3,855,443 | A | * | 12/1974 | Bell et al. ................... | 219/69.19 |
| 3,875,362 | A | * | 4/1975 | Balleys ....................... | 219/69.13 |
| 3,943,321 | A | * | 3/1976 | Pfau et al. .................. | 219/69.17 |
| 3,996,445 | A | * | 12/1976 | Wohlabaugh .............. | 219/69.13 |
| 4,376,880 | A | * | 3/1983 | Inoue .......................... | 219/69.13 |
| 4,700,039 | A | * | 10/1987 | Konno et al. .............. | 219/69.13 |
| 5,183,988 | A | * | 2/1993 | Takeuchi et al. ........... | 219/69.17 |

(Continued)

FOREIGN PATENT DOCUMENTS
EP 0 038 662 A2 10/1981
(Continued)

*Primary Examiner* — Geoffrey S Evans
(74) *Attorney, Agent, or Firm* — Sughrue Mion, PLLC

(57) ABSTRACT

In an electric discharge machining, in order to reduce damage of an object to be machined and an electrode and to achieve machining velocity enhancement and reduction of electrode wear amount by appropriately controlling a short-circuit current that flows when the electrode and the object to be machined are short-circuited, an electric-discharge-machining power supply apparatus for machining an object to be machined by interrupting every predetermined time period pulse trains that are turned on and off at predetermined timing, to supply electric power to a machining gap between a machining electrode (2) and the object (3) to be machined includes: a short circuit detecting means (11) for detecting a short circuit at the machining gap between the machining electrode (2) and the object (3) to be machined; and a pulse halting means (12) for, when the short circuit detecting means (11) detects a short circuit occurrence at the machining gap, halting generation of particular pulses in the pulse train so as to halt the power supply to the machining gap.

23 Claims, 21 Drawing Sheets

U.S. PATENT DOCUMENTS 5,359,169 A * 10/1994 Kaneko ............... 219/69.18
6,576,858 B1 * 6/2003 Yokomichi ............ 219/69.17

FOREIGN PATENT DOCUMENTS

| | | | | |
|---|---|---|---|---|
| GB | 2 053 064 A | | 2/1981 | |
| JP | 49-120294 A | | 11/1974 | |
| JP | 49-120295 A | | 11/1974 | |
| JP | 50-500 A | * | 1/1975 | |
| JP | 61-061711 A | | 3/1986 | |
| JP | 1-103228 A | * | 4/1989 | |
| JP | 2-4721 U | | 1/1990 | |
| JP | 3-55117 A | | 3/1991 | |
| JP | 7-156019 A | | 6/1995 | |
| JP | 11-824 A | | 1/1999 | |

* cited by examiner

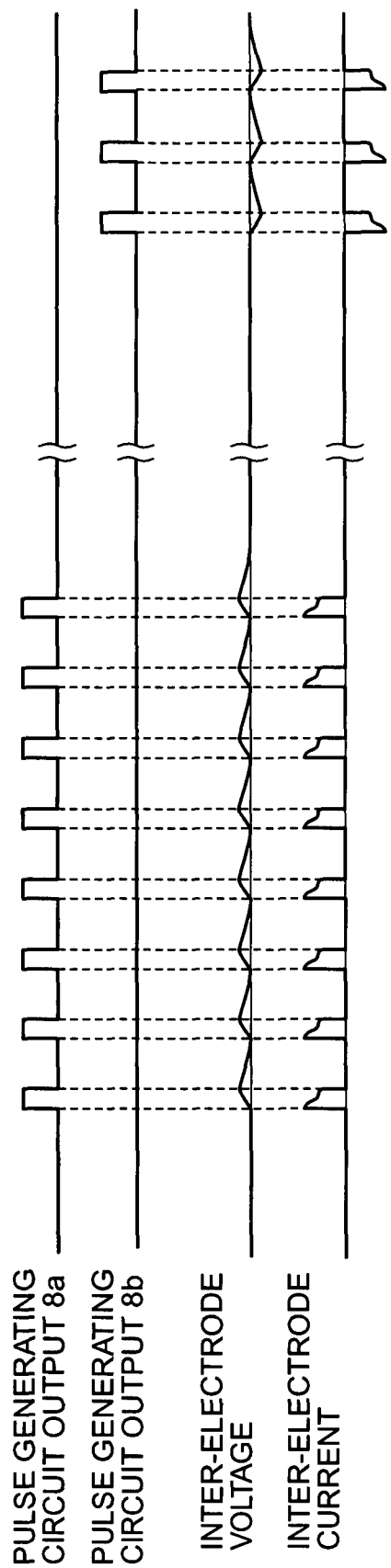

ELECTRIC-DISCHARGE-MACHINING POWER SUPPLY APPARATUS AND ELECTRIC DISCHARGE MACHINING METHOD

TECHNICAL FIELD

The present invention relates to electric-discharge machining apparatuses, and particularly to control of short-circuit current that flows when a machining electrode and an object to be machined are short-circuited.

BACKGROUND ART

As an electric-discharge-machining power supply apparatus for supplying electric power to a machining gap between a machining electrode and an object to be machined by interrupting every predetermined downtime a pulse train that is turned on and off at predetermined timing, to perform electric discharge machining, an, electric-discharge-machining power supply apparatus utilizing charge and discharge of a capacitor as illustrated in FIG. 14 has been known.

In the diagram, a variable voltage DC power supply 1 supplies machining power between the machining electrode 2 and the object 3 to be machined, disposed in machining fluid and facing each other with a very small gap. In accordance with a switching-device driving pulse signal 8a from a pulse generating circuit 8, when the pulse signal 8a is high, a switching device 4 is turned on, so that voltage is applied between the electrode 2 and the object 3 to be machined, and when the pulse signal 8a is low, the switching device 4 is turned off, so that applying the voltage between the electrode 2 and the object 3 to be machined is halted.

In addition, the pulse generating circuit 8 operates based on pulse generating conditions such as pulse on/off time, the number of pulses in a pulse train, and downtime between pulse trains, from a pulse generating condition setting unit 9 such as an NC device.

FIGS. 15, 16, and 17 are diagrams illustrating relations between pulse trains from the pulse generating circuit 8, an inter-electrode voltage, and an inter-electrode current.

FIG. 15 illustrates a state in which no electric discharge has occurred because the gap between the machining electrode 2 and the object 3 to be machined is large. While the switching device 4 is on, a capacitor 6 is charged by a time constant determined almost by the resistance value of a current-limiting resistor 5 and the capacitance of the capacitor 6, and while the switching device 4 is off, the electric charge in the capacitor 6 is discharged through a discharging resistor 7 by the time constant determined by the resistance value of the discharging resistor 7 and the capacitance of the capacitor 6.

As illustrated in the figure, because the resistance value of the discharging resistor 7 is determined to be large enough compared with the resistance value of the current-limiting resistor 5 for charging, even if the switching device 4 is turned off, the electric charge in the capacitor 6 does not run down immediately, so that the voltage across the gap between the machining electrode 2 and the object 3 to be machined is increasing step by step, such as the first pulse, the second pulse, and the like in the pulse train, up to around the voltage V1 of the DC power supply 1.

When the pulse train is terminated, a pulse downtime starts, and the inter-electrode voltage is gradually going down close to 0 V. When the pulse downtime of a predetermined time period elapses, the next pulse train is generated.

FIG. 16 illustrates a state in which electric discharges have occurred in portions A, B, and C.

The portion A indicates a state in which an inter-electrode dielectric breakdown has happened so that an electric discharge has occurred, while the voltage is rising during the third pulse in the pulse train. The discharge current value at that time is the sum of a discharge current due to the electric charge charged in the capacitor 6 and a charging current flowing from the DC power supply 1 through the switching device 4, the diode 10, and the charging current-limiting resistor 5.

The portion B indicates that a state in which an inter-electrode dielectric breakdown tends to occur persists after the portion A, whereby an electric discharge has occurred in succession to the portion A. The discharge current value at this time is a little lower than the discharge current value during the portion A, because an electric discharge has occurred when the charged voltage of the capacitor 6 is a little lower. The portion C indicates that, after the electric discharge in the portion B, the inter-electrode voltage has been gradually increasing, and then a dielectric breakdown has occurred, to cause a discharge current to flow.

FIG. 17 illustrates a case in which the inter-electrode gap is narrow and short-circuited. While the machining electrode 2 and the object 3 to be machined are short-circuited, a short-circuit current determined by the voltage V1 of the DC power supply 1 and the resistance value of the current-limiting resistor 5 flows between the machining electrode and the object as an inter-electrode current every time the switching device 4 is driven by the pulse generating circuit 8.

FIG. 18 is a diagram illustrating the configuration of an electric-discharge-machining power supply apparatus of a type in which AC pulse voltage is applied to the machining gap between the machining electrode and the object to be machined.

In addition to the configuration of the DC-pulse type power supply apparatus illustrated in FIG. 14, a DC power supply device 17, a switching device 4a composed of a MOS-FET or the like, a current-limiting resistor 5a, and a diode 10a are included.

In the meantime, FIGS. 19, 20, and 21 are diagrams illustrating relations between pulse trains from the pulse generating circuit 8, the inter-electrode voltage, and the inter-electrode current. The driving pulse signal 8a for the switching device 4 is generated so as to include a predetermined number of pulses at a predetermined on/off time, and after a predetermined downtime, the pulse signal 8b for driving the switching device 4a is generated so as to include the same number of pulses as in 8a. The pulse train 8a and the pulse train 8b are alternately repeated at the predetermined downtime.

A similar electric-discharge-machining power supply apparatus of an AC pulse type in which voltage of both positive and negative polarities is applied to the gap between the object to be machined and a machining electrode is disclosed, for example, in Japanese Patent Laid-Open No. 55117/1991.

FIG. 19 illustrates a state in which no electric discharge has occurred because the gap between the machining electrode and the object to be machined is large. While the pulse signal 8a is being outputted, the inter-electrode voltage is saturated around V1. Then after the following downtime, while the pulse signal 8b is being outputted, the inter-electrode voltage is in the reverse polarity and saturated around V2.

FIG. 20 illustrates a state in which electric discharges have occurred in portions A, B, C, and D. The polarity of the discharge current in the portion D is obviously opposite to those in the portions A, B, and C.

FIG. 21 illustrates a state in which the machining electrode and the object to be machined are short-circuited. The polarity of the short-circuit current is also reversed every time the polarity of the inter-electrode voltage is reversed.

Patent document 1: Japanese Patent Laid-Open No. 55117/1991

DISCLOSURE OF THE INVENTION

Problem that the Invention is to Solve

As above, because a power supply apparatus for a conventional electric discharge machine can flow a short pulse-width current between the machining electrode 2 and the object 3 to be machined, the conventional power supply apparatus has been used for performing highly accurate machining with a wire electric-discharge machining apparatus or a die-sinking electrical discharge machining apparatus, and used for a small-hole electric-discharge machining apparatus for drilling small holes.

Here, as illustrated in FIGS. 17 and 21, if the machining electrode 2 and the object to be machined are short-circuited, the current flows at every pulse. However, the short-circuit current in this case does not largely contribute to machining. In addition, because each pulse current is very small, it has been considered that there is little adverse impact, and the problem has been overlooked.

However, a recent experimental test has showed that, particularly when microscopical hole drilling or the like is performed using a small-hole electric-discharge machining apparatus, in some cases, the short-circuit current increases the amount of electrode wear or makes the machining unstable, or when a short circuit lasts for a long time, a minute electrode is glowing red hot or burned out.

These are believed to be caused by large increase of the electrode temperature due to Joule heat by the pulse currents flowing in succession during a short circuit occurrence.

The present invention has been made to resolve the problems, and aims to stabilize the machining and reduce electrode wear by appropriately controlling pulse generation in the electric-discharge-machining power supply apparatus when short circuits occur.

Means for Solving the Problem

In an electric-discharge-machining power supply apparatus for machining an object to be machined by interrupting every predetermined time period pulse trains that are turned on and off at predetermined timing, to supply electric power to a machining gap between a machining electrode and the object to be machined, the electric-discharge-machining power supply apparatus relevant to the present invention includes: a short circuit detecting means for detecting a short circuit at the machining gap between the machining electrode and the object to be machined; and a pulse halting means for, when the short circuit detecting means detects a short circuit occurrence at the machining gap, halting generation of particular pulses in the pulse train so as to halt the power supply to the machining gap.

Effects of the Invention

According to the present invention, the machined surface can be prevented from getting rough due to continuous flow of the short-circuit current, the amount of electrode wear can be prevented from increasing, and unstable machining can be prevented.

In addition, when the invention is applied to a small-hole electric discharge machining using a small-hole machining electrode, a minute electrode can be prevented from glowing red hot or being burned out.

BRIEF DESCRIPTION OF DRAWINGS

FIG. 21 is a diagram illustrating signals of some portions and inter-electrode waveforms when the inter-electrode gap is short-circuited in the configuration of FIG. 18.

DESCRIPTION OF THE SYMBOLS

1: DC power supply, 2: electrode, 3: object to be machined, 4: switching device, 5: resistor, 6: capacitor, 7: resistor, 8: pulse generating circuit, 9: pulse generating condition setting section, 10: diode, 11: short-circuit detecting circuit, 12: pulse halting circuit, 13: AND circuit, 14: DC power supply, 15: switching device, 16: resistor, 17: DC power supply, 18: short circuit detection signal.

BEST MODE FOR CARRYING OUT THE INVENTION

Embodiment 1.

Hereinafter, Embodiment 1 of the present invention will be described in reference to drawings.

Figure 1:
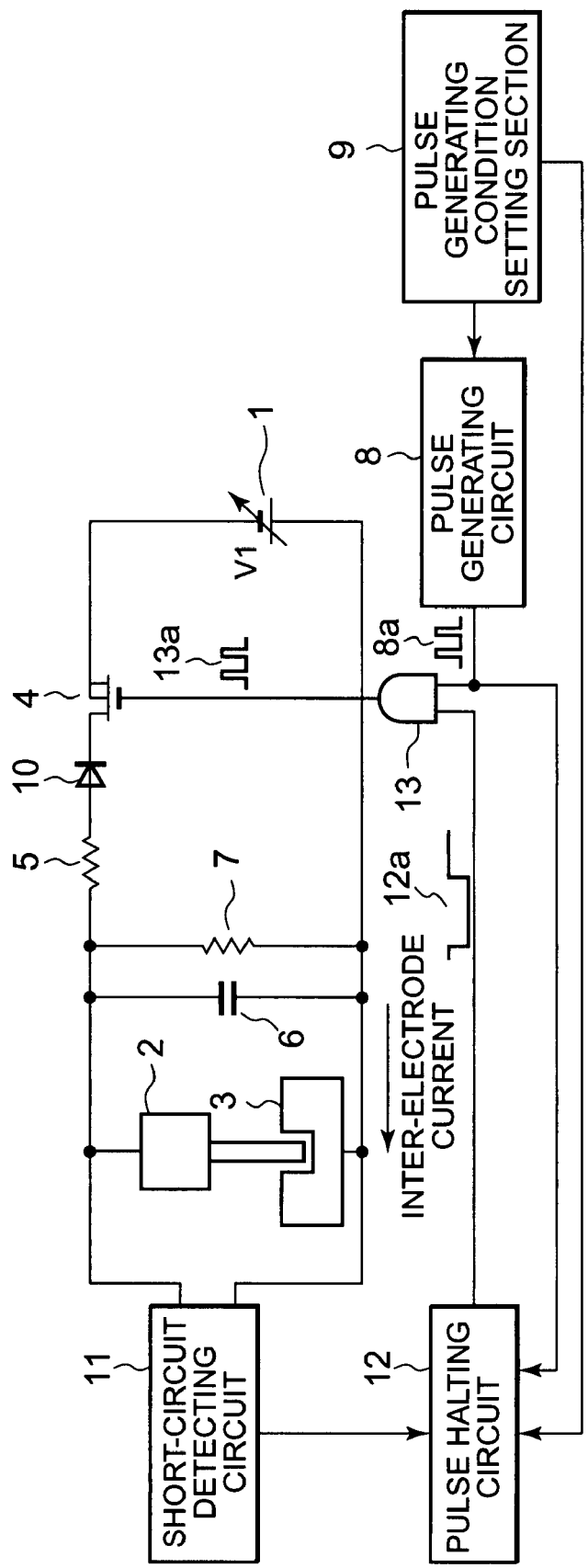
FIG. 1 is a configuration diagram of an electric-discharge-machining power supply apparatus explaining Embodiment 1.
Figure 2:
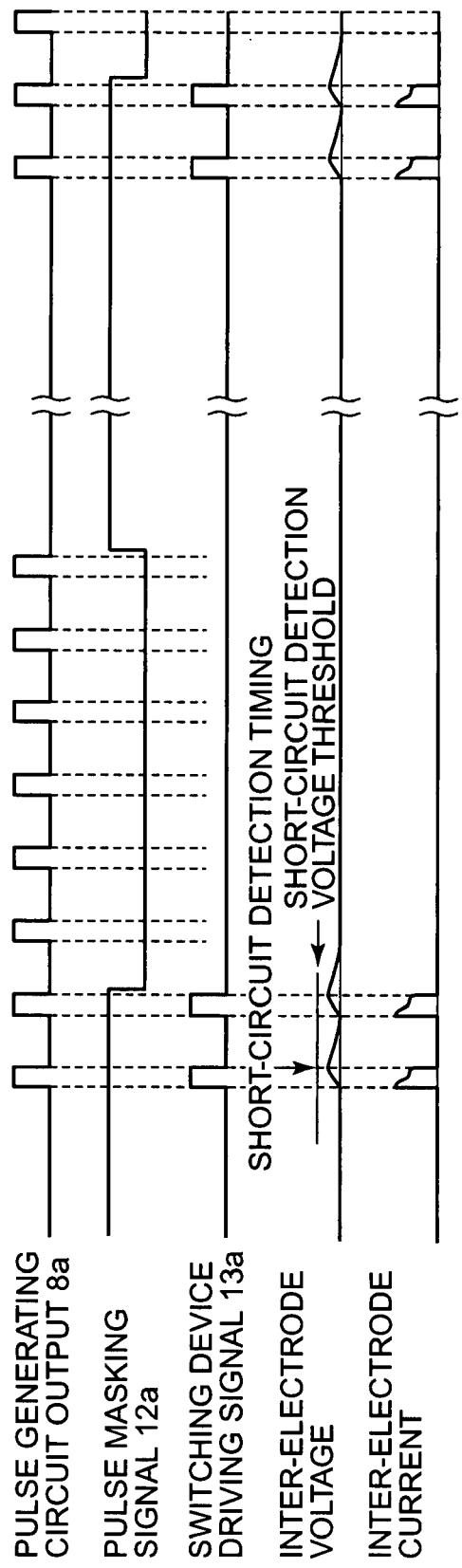
FIG. 2 is an operational timing chart for the configuration in FIG. 1.

FIG. 1 illustrates a configuration diagram illustrating a circuit configuration of an electric discharge machine. FIG. 2 illustrates signals of some portions and the inter-electrode voltage and current waveforms in the configuration illustrated in FIG. 1.

In the diagram, numeral 1 denotes a DC power supply whose voltage V1 is variable and can be externally set by an unillustrated setting means. Numeral 2 denotes a machining electrode. Numeral 3 denotes an object to be machined. Numeral 4 denotes a switching device such as a MOS-FET. Numeral 10 denotes a diode. Numeral 5 denotes a current-limiting resistor. Numeral 6 denotes a capacitor connected in parallel to the machining electrode 2 and the object 3 to be machined. Numeral 7 denotes a resistor for discharging the capacitor 6 with a long time constant. Numeral 8 denotes a pulse generating circuit for generating signals for driving the switching device 4. Numeral 9 denotes a pulse generating condition setting section such as an NC device, in which not only an operator designates, depending on machining contents, basic conditions of generating pulse trains such as a pulse on-off time in a pulse train, the number of pulses in a pulse train, and a pulse downtime, but generation profiles of electric discharge pulses are designated by designating the number of pulses generated after short circuit detection described later automatically based on the designated basic conditions of generating pulse trains or manually by the operator.

Numeral 11 denotes a short-circuit detecting circuit for outputting a signal when the inter-electrode gap is short-circuited. Numeral 12 denotes a pulse halting circuit for outputting a low level signal during a predetermined number of pulses in a pulse train when receiving a short circuit detection signal from the short-circuit detecting circuit 11, and counts the number of pulses generated from the pulse generating circuit 8 and compares the number with the pulse generation number after short-circuit detection, designated by the pulse generating condition setting section 9, to determine the timing for outputting the low level signal.

In addition, returning the signal to the high level is performed during the downtime from the end of a pulse train to the next pulse train generation.

Numeral 13 denotes an AND circuit operating so as to mask the pulse signals from the pulse generating circuit 8 while a low level signal is outputted from the pulse halting circuit 12, to prevent the switching device 4 from being driven.

Next, an operation example of the components will be described using FIG. 2.

Figure 16:
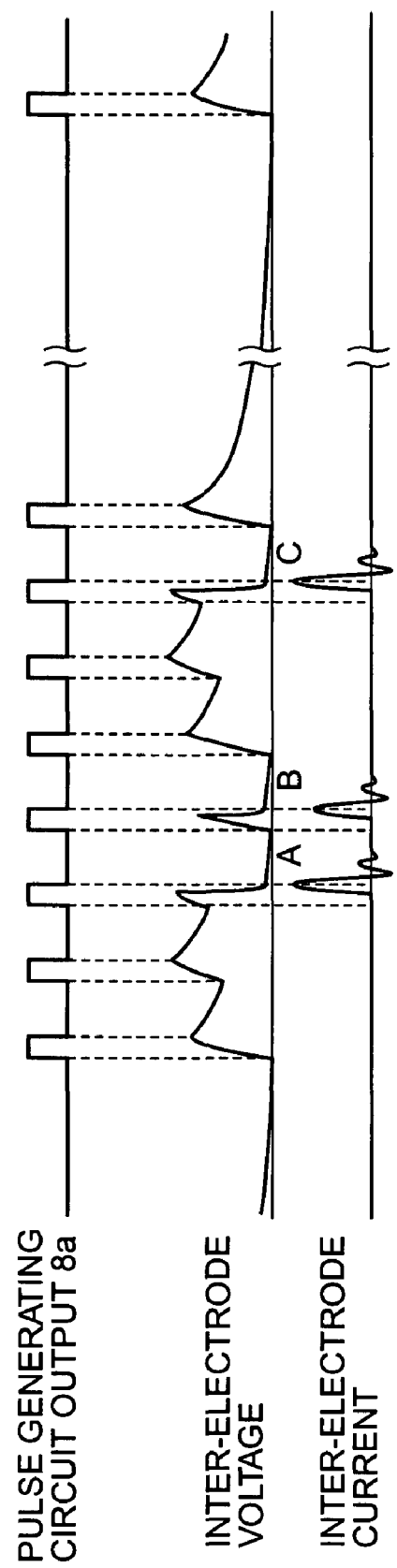
FIG. 16 is a diagram illustrating a signal of some portion and inter-electrode waveforms when an electric discharge occurs in the configuration of FIG. 14.
Figure 17:
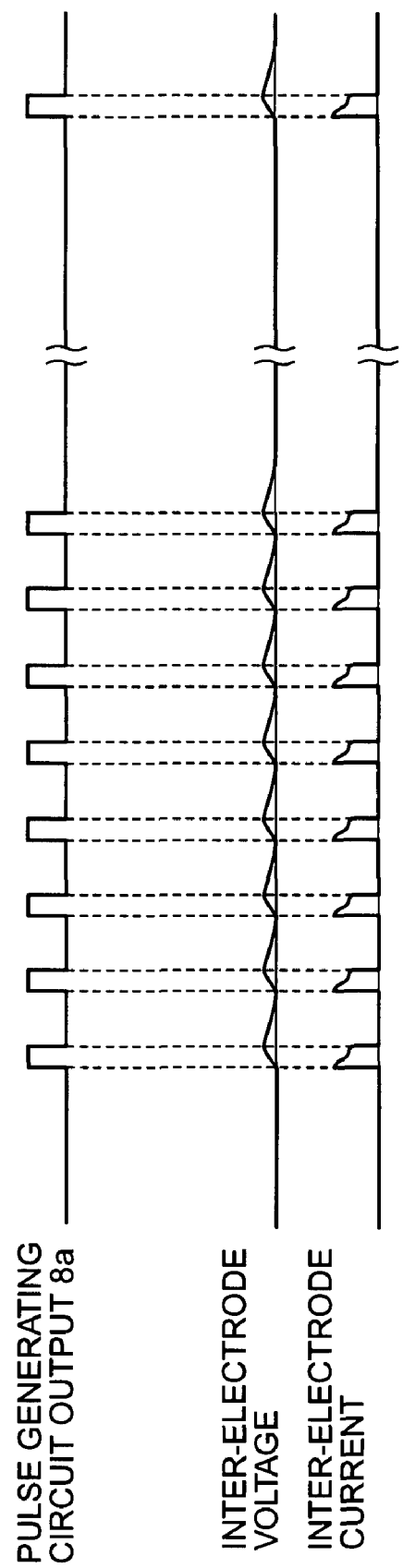
FIG. 17 is a diagram illustrating a signal of some portion and inter-electrode waveforms when the inter-electrode gap is short-circuited in the configuration of FIG. 14.
Figure 18:
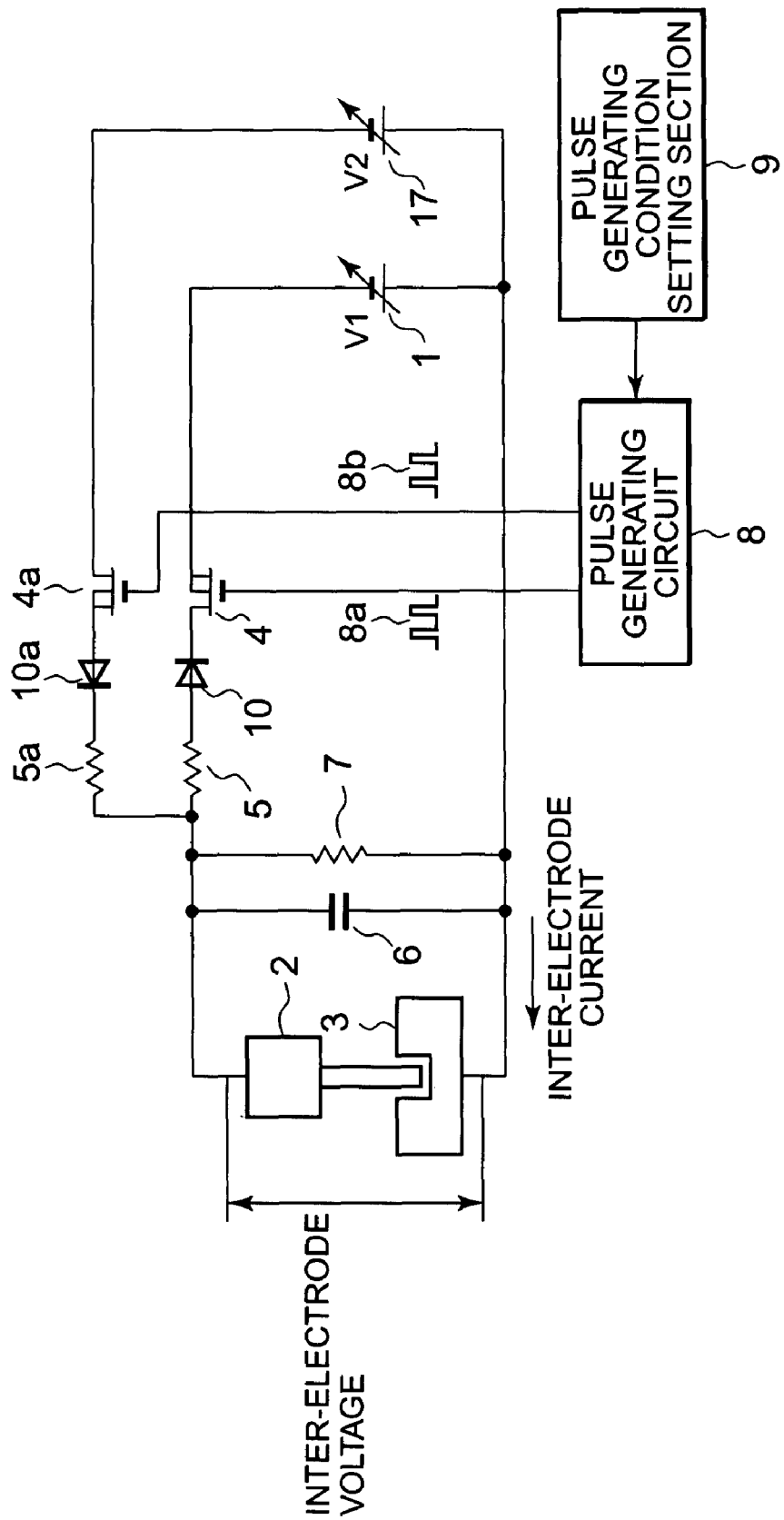
FIG. 18 is a configuration diagram of a conventional bipolar electric-discharge-machining power supply apparatus.
Figure 19:
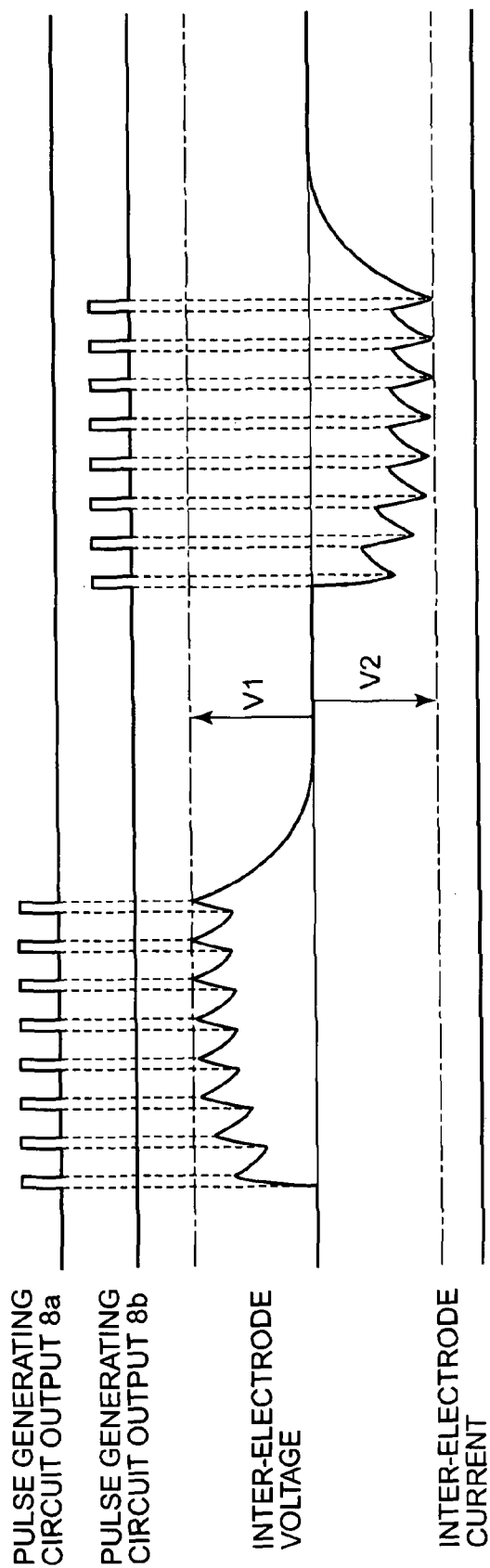
FIG. 19 is a diagram illustrating signals of some portions and inter-electrode waveforms when the inter-electrode gap is open in the configuration of FIG. 18.
Figure 20:
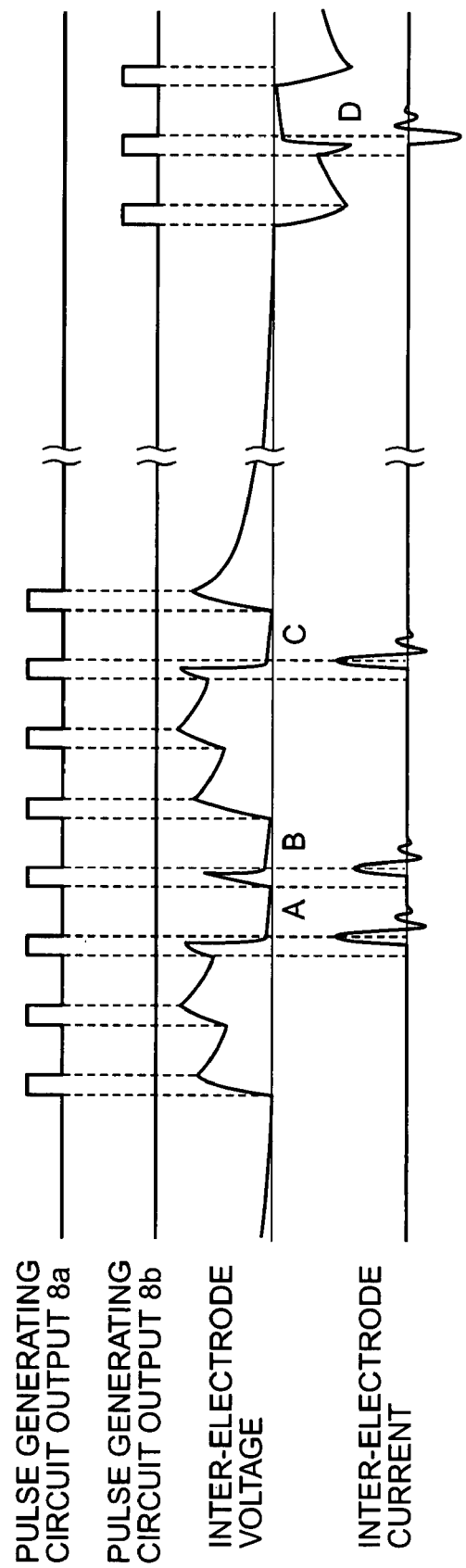
FIG. 20 is a diagram illustrating signals of some portions and inter-electrode waveforms when an electric discharge occurs in the configuration of FIG. 18.

The operation example in FIG. 2 is illustrated in contrast with FIG. 16 for the conventional circuit, and illustrates signals of some portions when the inter-electrode gap is short-circuited.

Based on instructions from the pulse generating condition setting section 9, such as the pulse on-off time, the number of pulses in a pulse train, and the downtime between pulse trains, the pulse generating circuit 8 intermittently generates particular size of pulse trains 8a (for example, eight pulses in a pulse train).

Then, the outputted pulse signal 8a from the pulse generating circuit 8 is connected through the AND circuit 13 to the gate of the switching device 4.

One input of the AND circuit 13 is connected to the output of the pulse halting circuit 12. While the pulse halting signal is high, the output signal 8a of the pulse generating circuit becomes straight the on-off signal 13a for the switching device 4, and while the pulse halting signal is low, the on-off signal 13a for the switching device 4 becomes low, so that the switching device 4 turns off.

When the switching device 4 turns on, the DC power supply 1 is connected through the diode 10 and the current-limiting resistor 5 to the inter-electrode gap between the machining electrode 2 and the object 3 to be machined, and connected to the capacitor 6 and the discharging resistor 7 each connected in parallel to the inter-electrode gap.

Specifically, when the pulse generating circuit 8 generates the first pulse, the pulse turns on the switching device 4 through the AND circuit 13 for the pulse-on time, to apply a predetermined voltage to the inter-electrode gap.

Figure 14:
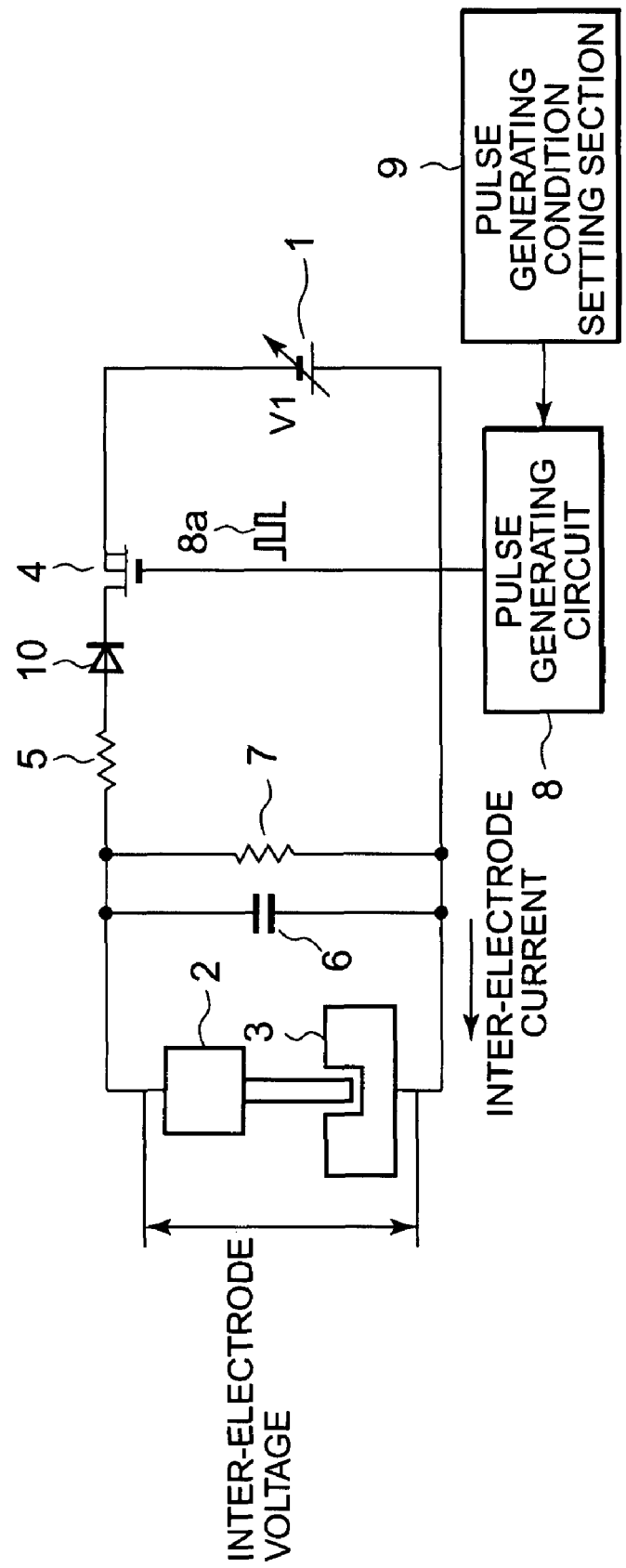
FIG. 14 is a configuration diagram of a conventional electric-discharge-machining power supply apparatus.

When the inter-electrode gap is open, as pulses are repeated, the inter-electrode voltage gradually increases while charging the capacitor 6 as described in FIG. 14.

Figure 15:
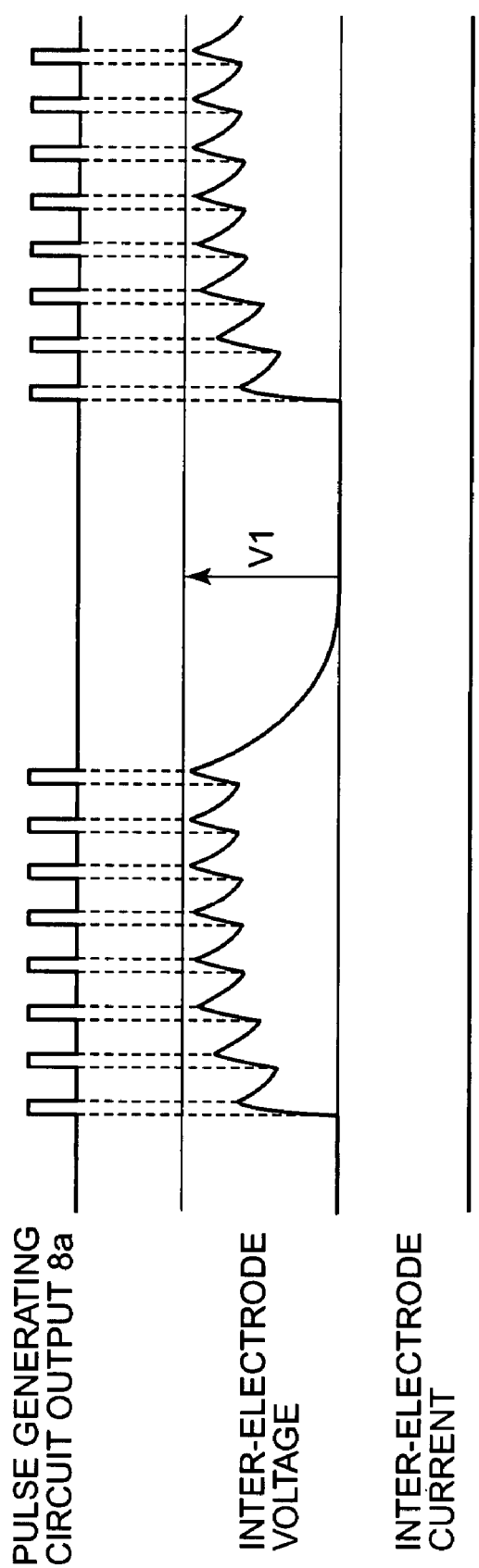
FIG. 15 is a diagram illustrating a signal of some portion and inter-electrode waveforms when the inter-electrode gap is open in the configuration of FIG. 14.

Then, while the inter-electrode gap is in the most appropriate state, an electric discharge occurs at the something pulse as described in FIG. 15, to perform electric discharge machining on the object 3 to be machined.

As described above, FIG. 2 illustrates the state in which the inter-electrode gap is short-circuited. In this case, little inter-electrode voltage is generated.

The short-circuit detecting circuit 11 determines whether or not the inter-electrode gap is short-circuited according to, for example, a method of comparing the inter-electrode voltage at the end of the first pulse in a pulse train with a predetermined threshold.

The threshold is designated to be a value close to 0 V in order to make a discrimination between an arc when the inter-electrode gap is short-circuited and from an arc voltage when an electric discharge occurs from a state in which the inter-electrode gap is isolated.

Then, when detecting a short circuit, the short-circuit detecting circuit 11 outputs a short circuit detection signal to the pulse halting circuit 12.

When receiving the short circuit detection signal, the pulse halting circuit 12 operates so as to generate a pulse halting signal (low level) after the timing of the pulse number predetermined by the pulse generating condition setting section 9.

Because the pulse halting signal outputted from the pulse halting circuit 12 is a low level signal, when the signal is inputted to one input of the AND circuit 13, another input pulse signal 8a from the pulse generating circuit 8 is masked, and the signal output to the switching device 4 is stopped.

In the case of FIG. 2, the configuration is such that the pulse halting signal is not generated during the first pulse after the short-circuit detection, and the pulse halting signal turns low to halt pulses during the second and succedent pulses after the short-circuit detection.

Therefore, only the two early pulses in the pulse train are generated, and short-circuit currents illustrated in FIG. 2 flow through the inter-electrode gap during that period. However, generation of pulses to the inter-electrode gap is stopped during the third pulse and thereafter, so that the pulse voltage is not applied to the inter-electrode gap, and no short-circuit current flows therethrough.

According to the present embodiment, when the inter-electrode gap is short-circuited, more pulses than the predetermined number of pulses are not generated, and the short-circuit current does not flow through the inter-electrode gap more than necessary.

Therefore, there is a benefit in that roughness of the machined surface and defects such as extraordinary wear or crack of the electrode, caused by continuous flow of the short-circuit current focusing on each one portion of the electrode and the object to be machined, can be prevented.

In addition, when the present circuit configuration is applied to a small-hole electric-discharge machining apparatus using a pipe electrode or a rod electrode, such problems can be prevented that the machined surface gets rough due to continuous flow of the short-circuit current, that the amount of electrode wear increases, that machining time gets long due to unstable machining, and that a minute electrode is glowing red hot or burned out.

Moreover, in the operational example of FIG. 2, an example has been described in which, after detection of a short circuit at the end of the first pulse in a pulse train, pulses are halted after generation of the second pulse. However, the circuit can be configured so as to halt the pulse generation at the second pulse immediately after the short circuit detection, or can be contrary configured so as to halt pulses after several pulses are generated after the short circuit detection.

When machining debris or the like is present like a bridge between the electrode and the object to be machined, degree of the effect of removing the debris or the like to recover the isolation can be changed by changing the number of pulses to be generated in detecting a short circuit.

In the meantime, because there is an adverse effect that flowing pulse currents during short circuit occurrence causes temperature rise of the electrode and increase in electrode wear amount, the pulse number is changed according to machining contents.

Moreover, the pulse for detecting a short circuit is not limited to the first pulse in a pulse train, but can be the second pulse or the later pulse. Similar effects can be achieved by halting pulses after detecting a short circuit.

Furthermore, the method is not limited to halting pulse generation for a single train of pulses by once detecting a short circuit, but generation of pulses for a plurality of pulse trains can be halted as a whole. However, it is preferable to halt pulse generation by detecting a short circuit for each train because the short-circuit current flow can be minimized.

Embodiment 2.

Figure 3:
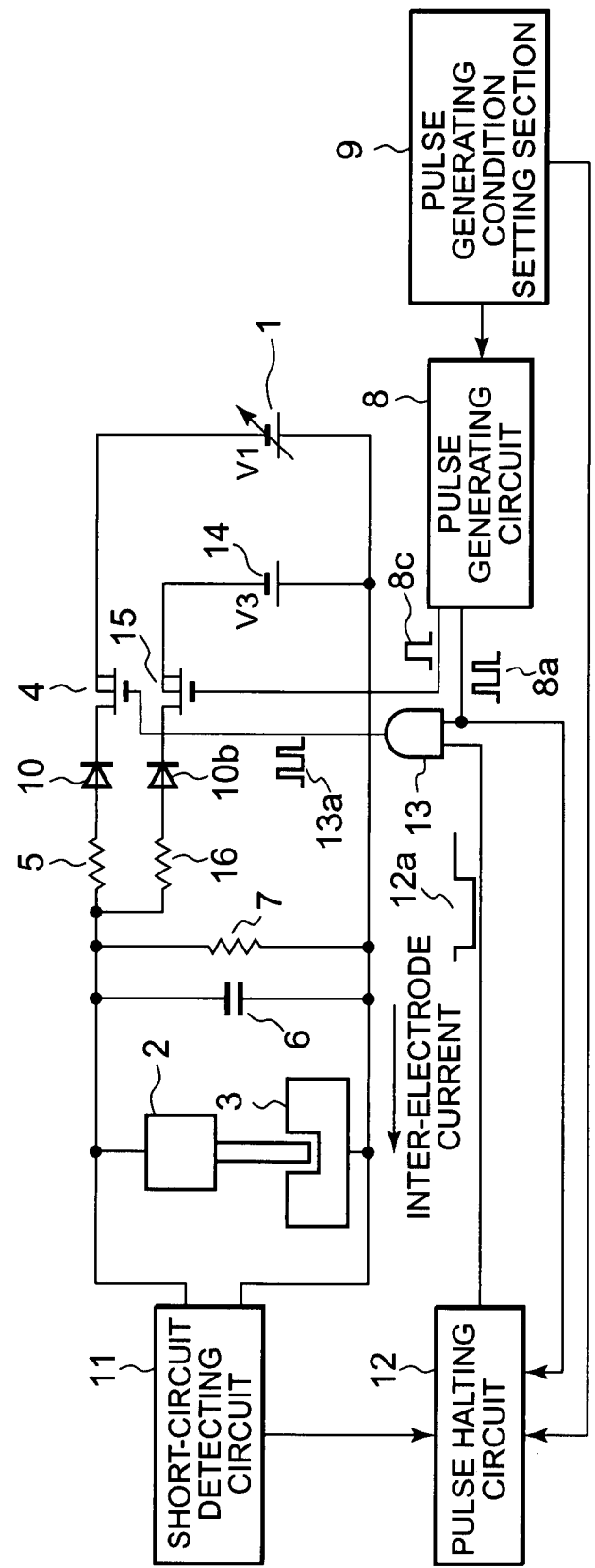
FIG. 3 is a configuration diagram of an electric-discharge-machining power supply apparatus explaining Embodiment 2.

FIG. 3 is a configuration diagram illustrating a circuit configuration of an electric discharge machine in the present Embodiment 2. A short-circuit detecting DC power supply 14, a short-circuit detecting switching device 15, a diode 10*b*, and a short-circuit detecting current-limiting resistor 16 are added to the configuration illustrated in FIG. 1.

In Embodiment 1, an example has been described in which whether the inter-electrode gap is short-circuited or not is detected after the first pulse output in the pulse generating circuit output 8*a*. In the meantime, in the present embodiment, whether or not the inter-electrode gap is short-circuited is detected during the downtime.

Next, the operation will be described using FIG. 4.

During the downtime between pulse trains, besides the driving signal 8*a*, a driving signal 8*c* is outputted from the pulse generating circuit 8 for driving the short-circuit detecting switching device 15 provided in addition to the switching device 4 for generating machining pulses.

When the driving signal 8*c* drives the switching device 15, the voltage V3 of the DC power supply 14 is connected through the diode 10*b* and the current-limiting resistor 16 to the inter-electrode gap.

Figure 4:
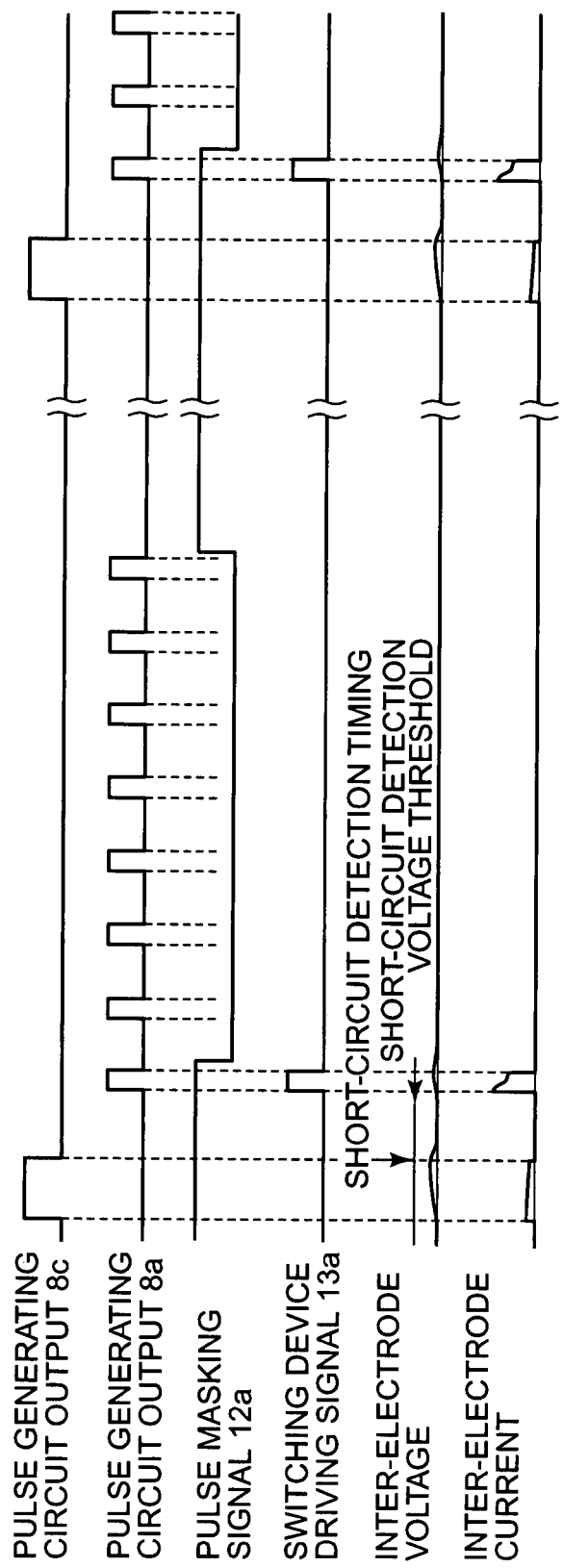
FIG. 4 is an operational timing chart for the configuration in FIG. 3.

The operational example in FIG. 4 illustrates a case in which the inter-electrode gap is short-circuited, and the inter-electrode voltage is close to 0 V.

Then, the short-circuit detecting circuit 11 is configured so as to determine whether or not the inter-electrode gap is short-circuited according to, for example, a method of comparing the inter-electrode voltage around the end of the short-circuit detecting pulse with a predetermined reference voltage close to 0 V.

Here, the voltage V3 of the short-circuit detecting DC power supply 14 is lower than the voltage V1 of the machining DC power supply 1, the resistance value of the short-circuit detecting current-limiting resistor 16 is the same as or larger than the machining current-limiting resistor 5, and the pulse width of the short-circuit detecting pulse is longer than the pulse width of the electric discharge machining pulse, all of which are designated to be constant values.

Therefore, even if machining-pulse conditions such as the voltage V1 of the DC power supply 1 for machining pulses, the resistance value of the current-limiting resistor 5, and the pulse width are changed, the generation state of the short-circuit detecting pulse is not changed, so that sensitivity of detecting a short circuit is not changed.

Moreover, because it is not necessary that the short-circuit detecting pulse width is as short as the on-time of the machining pulse, by designating the pulse width to be long, when the inter-electrode gap is not short-circuited, the inter-electrode voltage assuredly rises up around the short-circuit detecting power supply voltage V3 to be stabilized. Therefore, the difference from the short-circuit detection reference voltage can be made more distinct, so that comparing voltages in short circuit determination is performed more accurately, and a short circuit state and a non short circuit state can be discriminated assuredly.

Moreover, because the detecting power-supply voltage V3 has been set to be low, the current flowing through the inter-electrode gap, caused by the short-circuit detecting pulse during short circuit occurrence, is low at peak current, so that there is a benefit in that the machined surface of the object to be machined can be prevented from getting rough due to the short-circuit detecting pulse, and the electrode wear can be reduced because the current is not flowed more than necessary through the electrode.

When detecting a short circuit, the short-circuit detecting circuit 11 outputs a short circuit detection signal to the pulse halting circuit 12.

When receiving the short circuit detection signal, the pulse halting circuit 12 operates so as to generate a pulse halting signal (low level) after the timing of the pulse number predetermined by the pulse generating condition setting section 9.

Because the pulse halting signal is a low level signal, when the signal is inputted to one input of the AND circuit 13, another input pulse signal 8*a* from the pulse generating circuit 8 is masked, and the signal to the switching device 4 is stopped.

In FIG. 4, the case has been described in which the configuration is such that the pulse halting signal is not generated during the first pulse in the pulse train after the short-circuit detection, and the pulse halting signal turns low to halt pulses during the second and succedent pulses.

Therefore, only the one initial pulse in the pulse train is generated, and short-circuit currents illustrated in FIG. 4 are intentionally flowed through the inter-electrode gap during that period. In the meantime, generation of pulses is stopped during the second pulse and thereafter, so that the short-circuit current is not flowed therethrough.

According to the present embodiment, there is a benefit in that a short circuit can be assuredly detected during a pulse downtime under a constant condition independent from the machining pulse generation conditions.

In the meantime, in electric discharge machining using a minute electrode, because impacts of the short-circuit current, such as machining instability due to temperature rise in the electrode and increase in the electrode wear amount, are large, there are cases in which it is better to flow the short-circuit current as little as possible. In such cases, it is also possible to set the configuration so as not to flow the short-circuit current due to the machining pulse at all, so that there is a benefit in that more appropriate short-circuit current designation tailored to the machining object can be performed.

Furthermore, in such a case in which the present circuit configuration is applied to a small-hole electric-discharge machining apparatus to machine a very small hole using a minute electrode, because the tolerance current that can be flowed through the electrode is small, in order to prevent red glowing or burnout of the electrode due to the short-circuit current and to control increase of the electrode wear amount, it is better not to flow the current other than the electric discharge pulse current that contributes to machining when possible. In that case, the short-circuit current due to machining pulses is set not to be flowed at all, so that there is a benefit in that the electrode burnout and increase of the electrode wear can be suppressed.

In addition, generally an electric discharge machine performs servo control for controlling the inter-electrode distance according to the inter-electrode voltage, so that, when a short circuit occurs, it is necessary to quickly set back the electrode until the short circuit is eliminated.

According to the present invention, because the machining pulse generation is masked when a short circuit occurs, the mean value of the inter-electrode voltage during the short circuit occurrence is surely made smaller, so that the electrode can be set back more quickly, and there is a benefit in that the short circuit can be quickly eliminated.

In addition, in the case of FIG. 4, an example has been described in which pulses are masked after generation of the first pulse in the pulse train. However, the pulse halting circuit can be configured such that all the pulses after short circuit detection in the pulse train are masked, or configured such that the pulses are masked after several pulses are generated.

Moreover, the method is not limited to halting pulse generation for one train of pulses by once detecting a short circuit, but generation of pulses for a plurality of pulse trains can be halted as a whole. However, it is preferable to halt pulse generation by detecting a short circuit for each train because the short-circuit current flow can be minimized.

Example.

Figure 5:
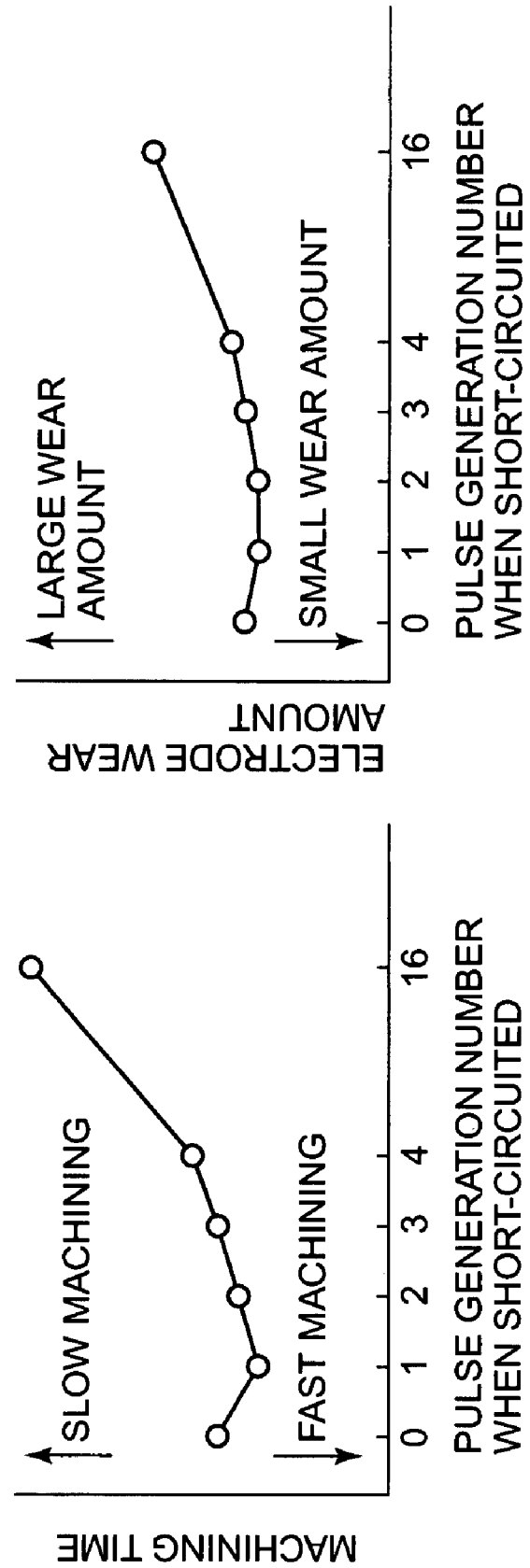
FIG. 5 illustrates graphs expressing relations between the number of pulses in a pulse train to be generated when a short circuit occurs, the machining velocity, and the amount of electrode wear.

FIG. 5 is an example in which effects of the short-circuit current control after short circuit detection on machining characteristics are verified by experiment using an electric discharge machining power supply according to Embodiment 2.

In the present machining test, a tungsten bar having a diameter of 80 μm is used as an electrode, and applied to a small-hole electric discharge machine for drilling an iron object of thickness around 1 mm to be machined. Given that the number of pulses in a pulse train is 16, the machining voltage is around 200 V, the downtime is 10 μsec, and the machining current-limiting resistor is 100Ω, relations of the number of pulses generated after short circuit detection (the number of pulses not to be halted) to the machining time, and to the electrode wear are illustrated.

Under the test condition, the case in which the number of pulses generated after short circuit detection is one has produced good results in both the machining velocity and the amount of electrode wear.

Adversely, under the condition in which all the 16 pulses' are generated as a conventional condition not to halt pulses at all when a short circuit occurs, the worst results have been produced in both the machining velocity and the amount of electrode wear.

Under the present test conditions, the case of generating only one pulse has produced the best result. However, according to other configuration conditions such as the number of pulses in a pulse train, the machining voltage, the current-limiting resistance value, and the downtime, the most appropriate pulse number varies from one to several pulses.

The cause of continuing short-circuit state is believed that short-circuit bridges are formed by machining debris collected by electromagnetic force generated by the short-circuit current. Because concentration of machining debris can be prevented by halting the current during the short-circuit occurrence, a method of removing short-circuit bridges by generating short-circuit eliminating pulses of a short pulse width when a short circuit continues for a predetermined time, to eliminate short circuits more rapidly, is disclosed (see Japanese Patent No. 2967682).

In the present invention, by generating only one or several pulses in the pulse train during short-circuit detection instead of continuing the pulse halting state for a predetermined period of time, the short-circuit current is largely reduced, so that the machining debris is prevented from concentrating, and the short-circuit bridges are removed. It is believed that as a result the short-circuit state is rapidly eliminated, so that the machining velocity is enhanced.

In addition, it is believed that the electrode temperature rise is more suppressed compared with the case of continuing the short-circuit current flow, so that the electrode wear amount is reduced.

In the meantime, in a case in which the electrode and the object to be machined are not short-circuited by bridges such as machining debris, but the electrode and the object are completely short-circuited, it is believed to be better not to flow too many short-circuit current pulses, because the effect of eliminating short circuits cannot be expected, and the electrode temperature rise and increase of the electrode wear would be caused thereby.

For example, for an ultraminute electrode whose diameter is around 30 μm, the electrode tolerance current is very small, there are cases in which it is better to flow no short-circuit current due to machining pulses.

Embodiment 3.

In the above-described embodiment, the case in which the machining is performed only with a DC power supply 1 has been explained. In the present embodiment, however, application of the present invention to an electric-discharge-machining power supply apparatus of a type in which AC pulse voltage is applied to the machining gap between a machining electrode and an object to be machined is described.

Figure 6:
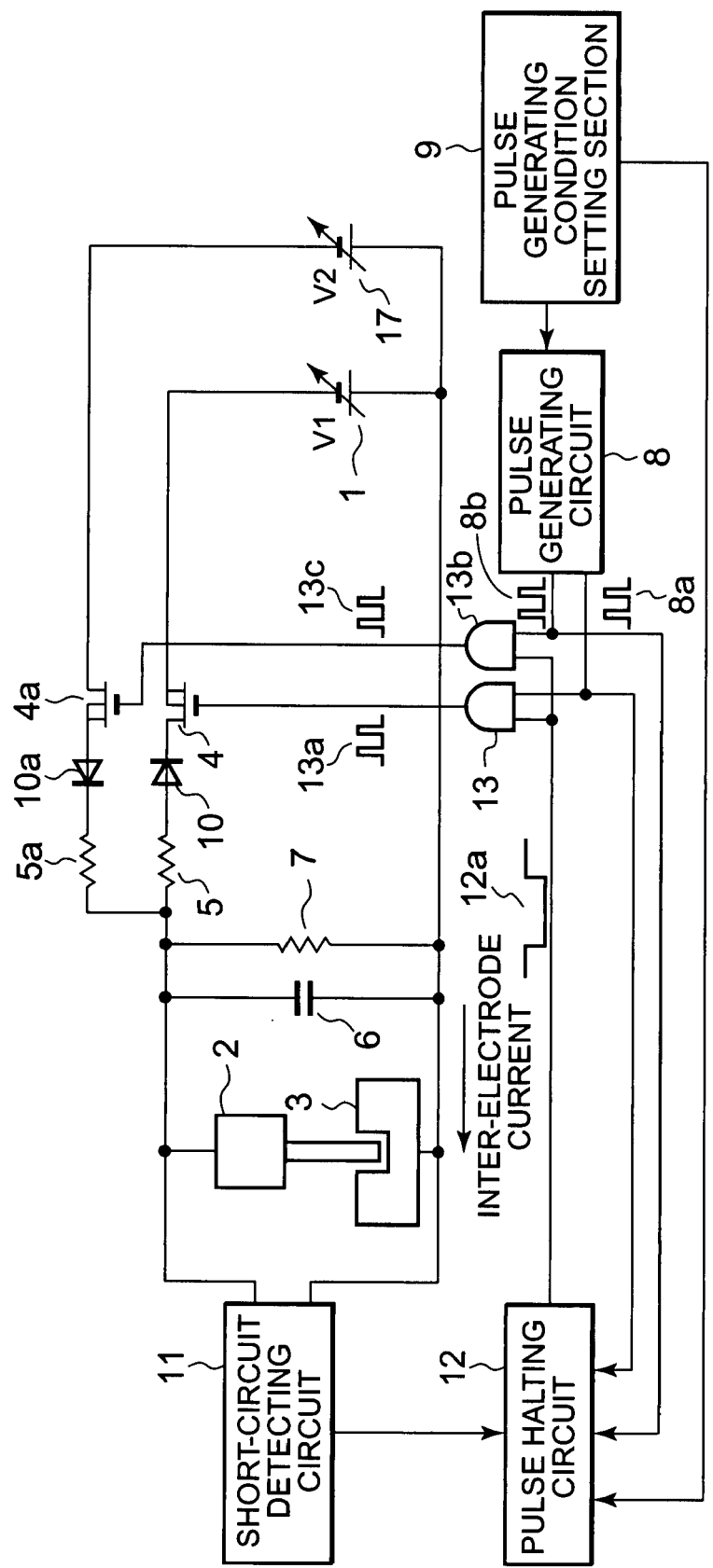
FIG. 6 is a configuration diagram of an electric-discharge-machining power supply apparatus explaining Embodiment 3.

FIG. 6 is a configuration diagram illustrating a circuit configuration of an electric discharge machine in the present Embodiment 3. A DC power supply 17 connected to the inter-electrode gap in the opposite polarity with respect to the DC power supply 1, a switching device 4a, a current-limiting resistor 5a, a diode 10a, and an AND circuit 13b are added to the circuit in FIG. 1 described in Embodiment 1.

Specifically, when the switching device 4 is on and the switching device 4a is off, the machining electrode 2 is in negative polarity with respect to the object 3 to be machined, and when the switching device 4 is off and the switching device 4a is on, the machining electrode 2 is in positive polarity, so that it is equivalent to a circuit in which a positive-and-negative polarity machining power supply is connected.

A bipolar power supply for electric discharge machining has an effect of suppressing so-called an electrolytic etching phenomenon in which an object to be machined is ionized during electric discharge machining, and therefore is used for recent wire-cut electrical discharge machines using water as machining fluid, some small-hole electric discharge machines, or the like.

Next, the operation will be described using FIG. 7.

Figure 7:
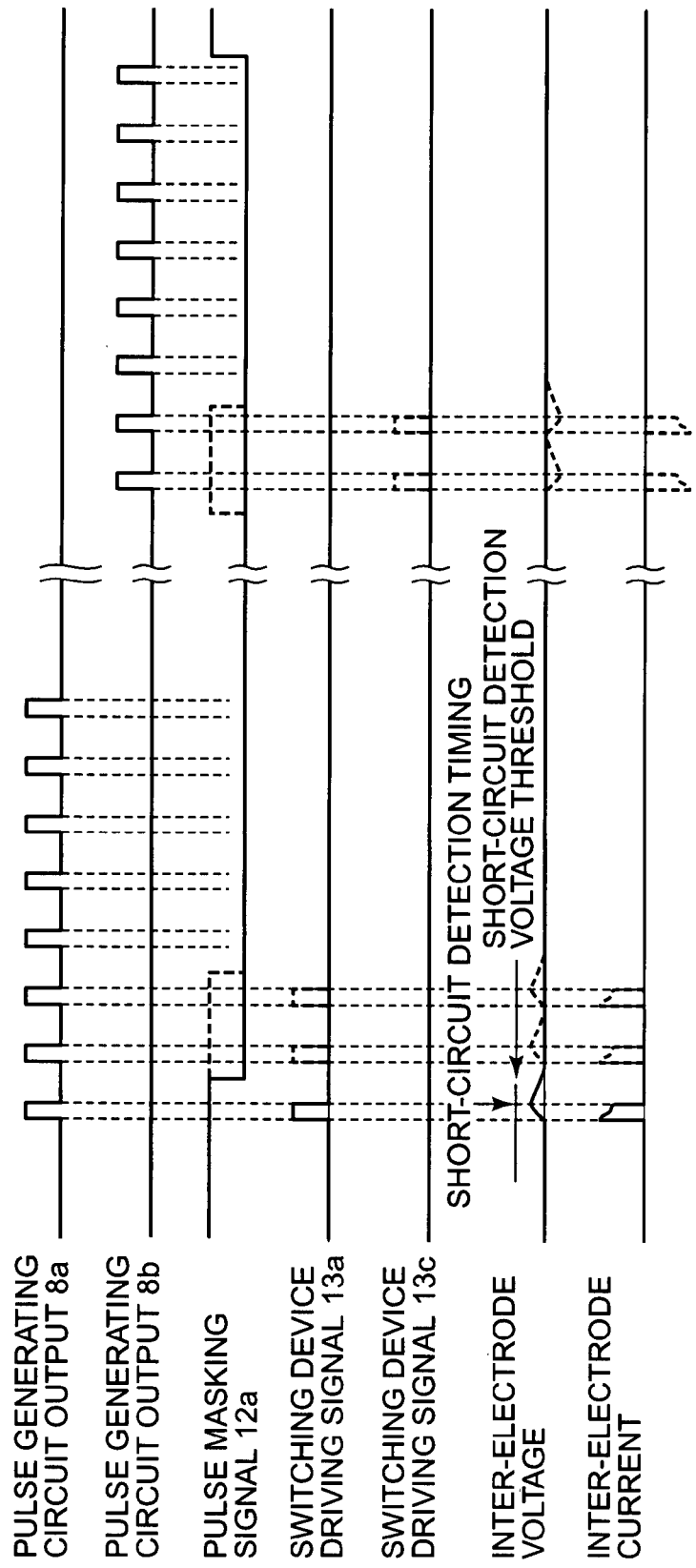
FIG. 7 is an operational timing chart for the configuration in FIG. 6.

The pulse generating circuit 8 in the present embodiment outputs the signals 8a and 8b alternately for each pulse train as illustrated in FIG. 7 in order to drive alternately for each pulse train the switching device 4 for the negative electrode polarity and the switching device 4a for the positive electrode polarity. The outputs are connected to one input of the AND circuit 13 and one input of the AND circuit 13b, respectively.

When the switching device 4 is turned on by the pulse 13a and the first pulse in the pulse train is outputted to the inter-electrode gap, whether or not the inter-electrode gap is short-circuited is determined by, for example, a method of comparing the voltage at the end of the first pulse with a predetermined threshold.

When a short circuit is detected, hereinafter in the same manner as in Embodiment 1, the pulse halting circuit 12 generates the pulse halting signal 12a, which is inputted to one input of the AND circuit 13 and one input of the AND circuit 13b to prevent both the pulse train signals 8a and 8b from the pulse generating circuit from being inputted to the switching devices 4 and 4a, respectively.

According to the present embodiment, in the configuration for generating pulses while inverting the polarity between the positive and negative polarities alternately for each pulse train, when the inter-electrode gap is short-circuited, more pulses than the predetermined number of pulses in both the positive polarity and negative polarity are not generated, and the short-circuit current does not flow through the inter-electrode gap more than necessary. Therefore, there is a benefit in that roughness of the machined surface and defects such as extraordinary wear or crack of the electrode, caused by continuous flow of the short-circuit current focusing on each one portion of the electrode and the object to be machined, can be prevented. Moreover, the pulse generation in both the positive polarity and negative polarity is halted, so that the effect of reducing electrolytic etching phenomenon, which is a feature of a positive-and-negative polarity power supply, is not diminished as well.

In addition, when the present circuit configuration is applied to a small-hole electric-discharge machining apparatus using a pipe electrode or a rod electrode, there are benefits in that such problems can be prevented that the machined surface gets rough due to continuous flow of the short-circuit current, that the amount of electrode wear increases, that machining time gets long due to unstable machining, and that a minute electrode is glowing red hot or burned out.

Moreover, solid lines in FIG. 7 in the present embodiment indicate a case in which the pulse generating condition setting section 9 is configured such that the number of pulses generated after short-circuit detection is zero, and the configuration is such that the pulse generation is masked immediately after the detection.

In the meantime, the pulse generation number in the reverse-polarity pulse train after the downtime following the pulse train in which the short circuit is detected during the first pulse is also controlled to be zero.

As a result, by minimizing the current to flow during the inter-electrode short circuit, there is a benefit in that, even in a case in which a minute electrode is used, the electrode can be prevented from being much consumed and from glowing or being burned out due to continuing flow of the short-circuit current not contributing to the machining.

Furthermore, as another method, broken lines in FIG. 7 show a case in which the pulse generating condition setting section 9 is so configured that the number of pulses generated after short-circuit detection is two. A pulse generation halting signal is outputted after two pulses are generated after the detection, and the pulse generation number for the pulse train in the reverse polarity after a downtime following the pulse train in which the short circuit has been detected is controlled to be two.

As a result, when machining debris or the like is present like a bridge between the electrode and the object to be machined, and the inter-electrode gap is short-circuited, there is an effect of removing the short-circuit bridge and recovering the isolation of the inter-electrode gap.

Embodiment 4.

Figure 8:
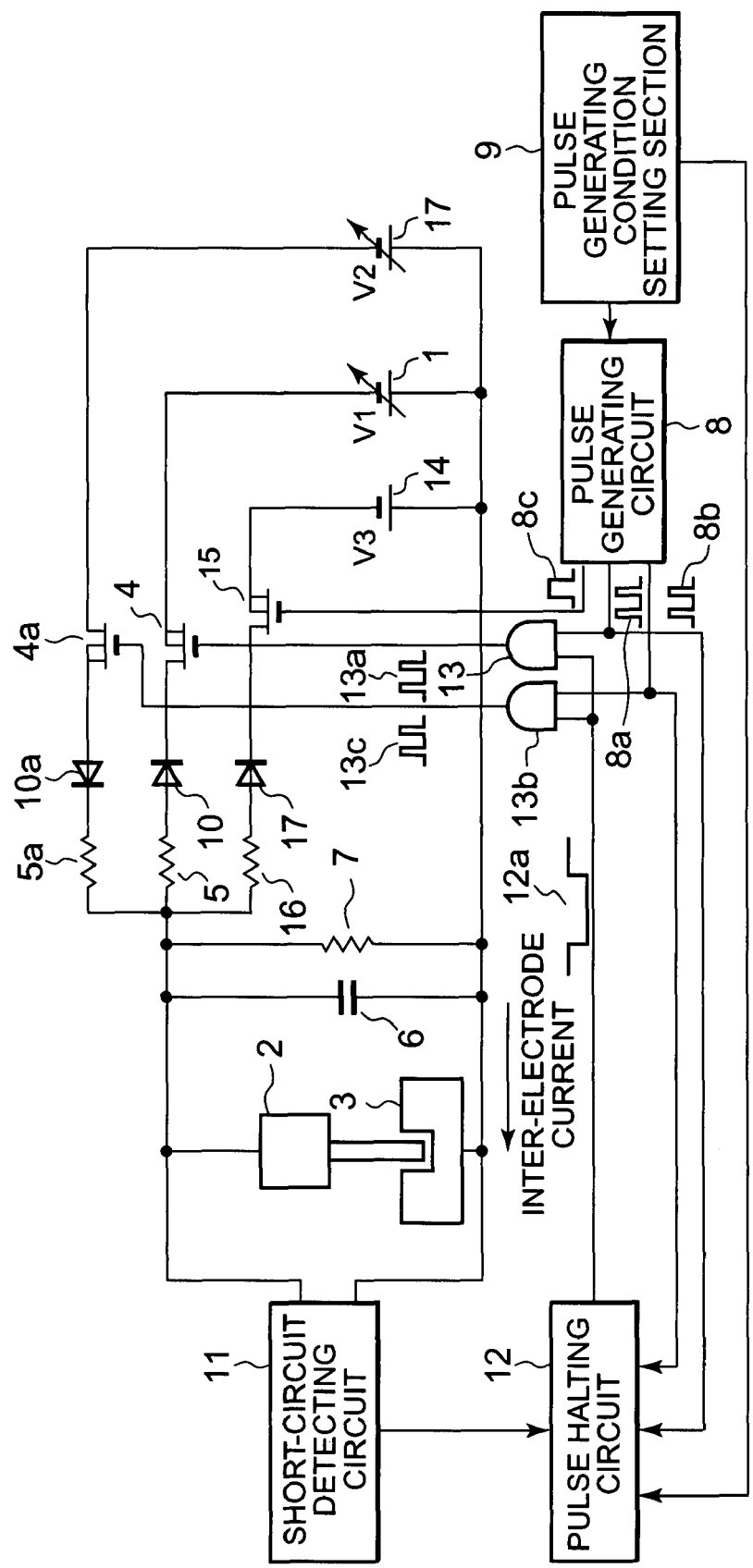
FIG. 8 is a configuration diagram of an electric-discharge-machining power supply apparatus explaining Embodiment 4.

FIG. 8 illustrates a configuration in which a reverse polarity generating unit as in Embodiment 3 is combined with the configuration explained in Embodiment 2.

Next, the operation will be described in reference to FIG. 9.

Figure 9:
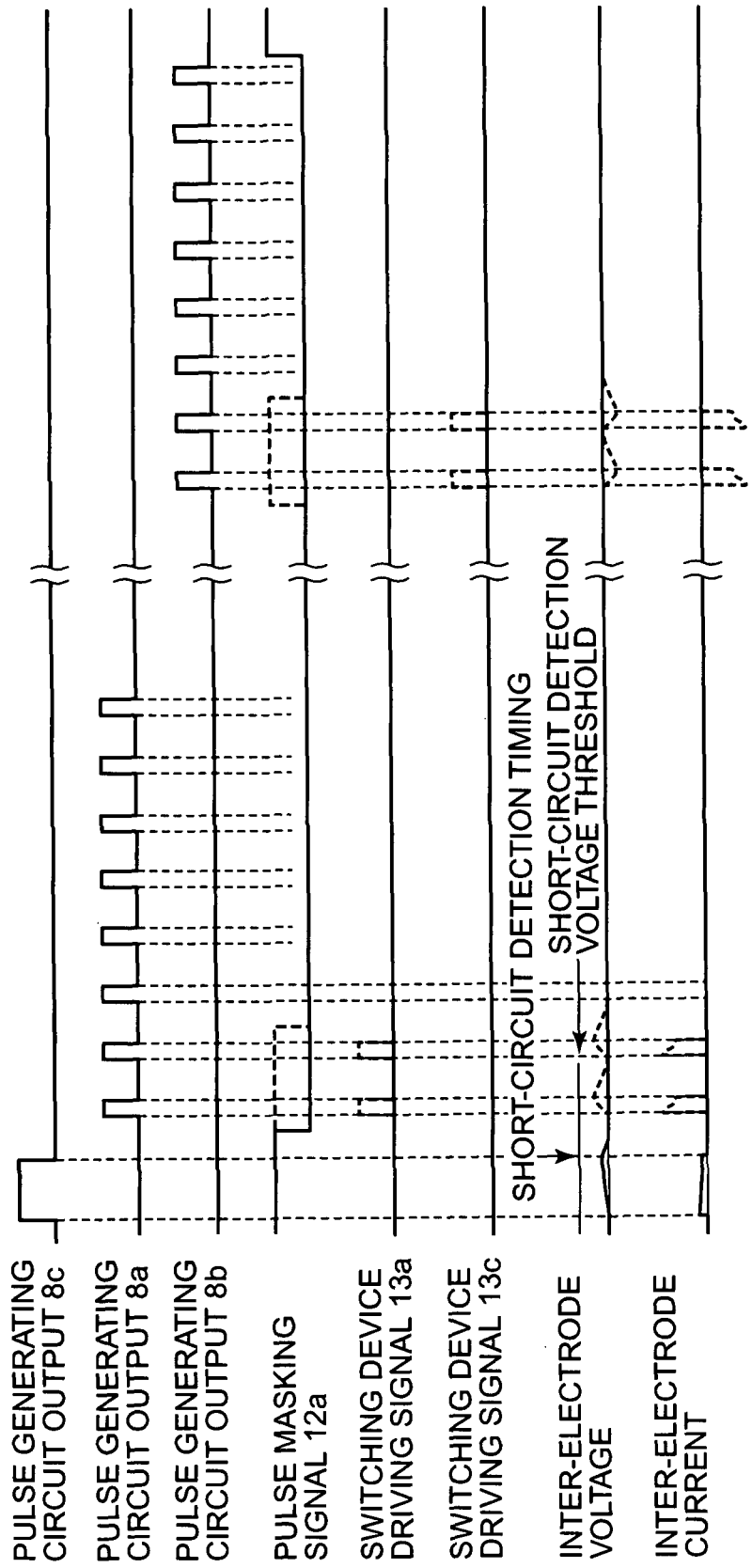
FIG. 9 is an operational timing chart for the configuration in FIG. 7.

FIG. 9 illustrates signals of some portions when the inter-electrode gap is short-circuited.

The pulse generating circuit 8 in the present embodiment generates a signal 8c for driving the short-circuit detecting switching device 15 during the downtime between the pulse trains, a signal 8a for driving the switching device 4 for the negative electrode polarity, and a signal 8b for driving the switching device 4a for the positive electrode polarity.

The signal 8a and the signal 8b are alternately generated in units of pulse trains, and inputted to one input of the AND circuit 13 and to one input of the AND circuit 13b, respectively.

When the short-circuit detecting circuit 11 detects a short circuit from the inter-electrode voltage or the like at the end of the short-circuit detecting pulse, the pulse halting circuit 12 generates a pulse halting signal 12a based on an instruction from the pulse generating condition setting section 9.

The switching device driving signals 8a and 8b are prevented from driving the switching devices 4 and 4a by the AND circuits 13 and 13b while the pulse halting signals are generated, so that the driving signals are like switching device driving signals 13a and 13c.

According to the present embodiment, there is a benefit in that, even in a configuration for generating pulses while inverting the polarity between the positive and negative polarities alternately for each pulse train, a short circuit can be assuredly detected during a pulse downtime under a constant condition independent from the machining pulse generation conditions.

Moreover, in electric discharge machining with a minute electrode, it is also possible to set the configuration so as not to flow the short-circuit current at all other than the current due to the short-circuit detecting pulse, so that there is a benefit in that more appropriate short-circuit current designation tailored to the machining object can be performed.

Moreover, the pulse generation in both the positive polarity and negative polarity is halted, so that the effect of reducing electrolytic etching phenomenon, which is a feature of a positive-and-negative polarity power supply, is not diminished as well.

In addition, when the present circuit configuration is applied to a small-hole electric-discharge machining apparatus using a pipe electrode or a rod electrode, there are benefits in that such problems can be prevented that the machined surface gets rough due to continuous flow of the short-circuit current, that the amount of electrode wear increases, that machining time gets long due to unstable machining, and that a minute electrode is glowing red hot or burned out.

Moreover, solid lines in FIG. 9 show a case in which the number of pulses to be generated after short-circuit detection is set to zero. As a result, no current due to the machining pulse flows during the inter-electrode short circuit, so that there is a benefit in that, even in the case of machining using a minute electrode, the electrode can be prevented from being much consumed and from glowing or being burned out due to continuing flow of the short-circuit current not contributing to the machining.

Furthermore, as another method, broken lines in FIG. 9 show a case in which the number of pulses to be generated after short-circuit detection is set to two. As a result, when machining debris or the like is present like a bridge between the electrode and the object to be machined, and the inter-electrode gap is short-circuited, there is an effect of removing the short-circuit bridge and recovering the isolation of the inter-electrode gap.

Embodiment 5.

Figure 10:
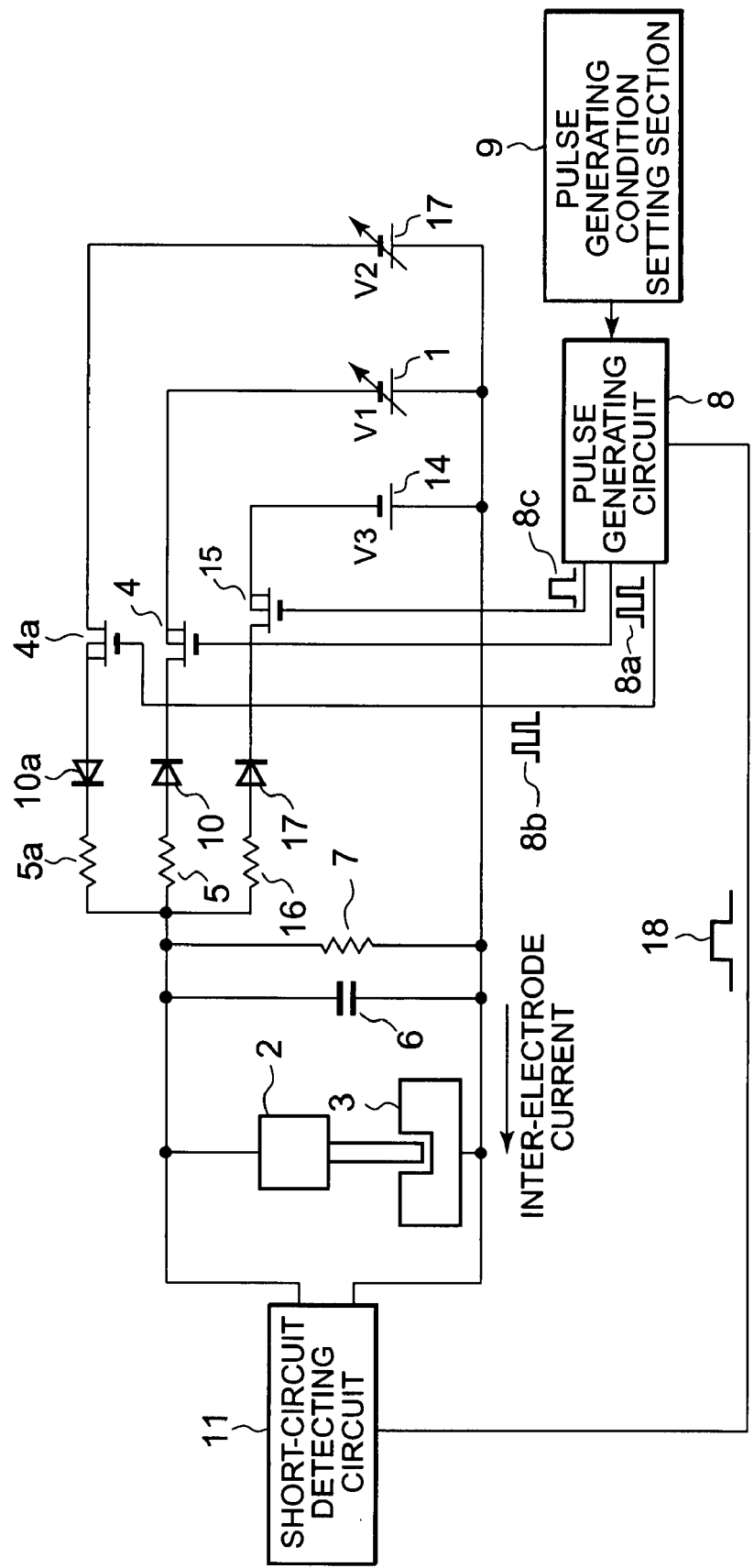
FIG. 10 is a configuration diagram of an electric-discharge-machining power supply apparatus explaining Embodiment 5 and Embodiment 7.

FIG. 10 is a configuration diagram illustrating an example of Embodiment 5.

In the present embodiment, the short-circuit detecting circuit 11, when detecting a short circuit in the machining gap between the machining electrode and the object to be machined, generates a short-circuit detection signal 18, which is sent to the pulse generating circuit 8. When the pulse generating circuit 8 receives the short circuit detection signal 18, the pulse generating circuit operates, for instance, so as to extend the downtime between the pulse train immediately after the short circuit detection and the next pulse train for a predetermined period of time, such as two times to dozens of times the designated downtime for a non short circuit state.

According to the present embodiment, because the mean current flowing through the inter-electrode gap during short circuit occurrence can be controlled, there is a benefit in that roughness of the machined surface and defects such as extraordinary wear or crack of the electrode can be prevented, and the short circuit state can be rapidly resolved by the effect of preventing concentration of machining debris.

In addition, when the present circuit configuration is applied to a small-hole electric-discharge machining apparatus using a pipe electrode or a rod electrode, there are benefits in that such problems can be prevented that the machined surface gets rough, that the amount of electrode wear increases, that machining time gets long due to unstable machining, and that a minute electrode is glowing red hot or burned out.

Embodiment 6.

Figure 11:
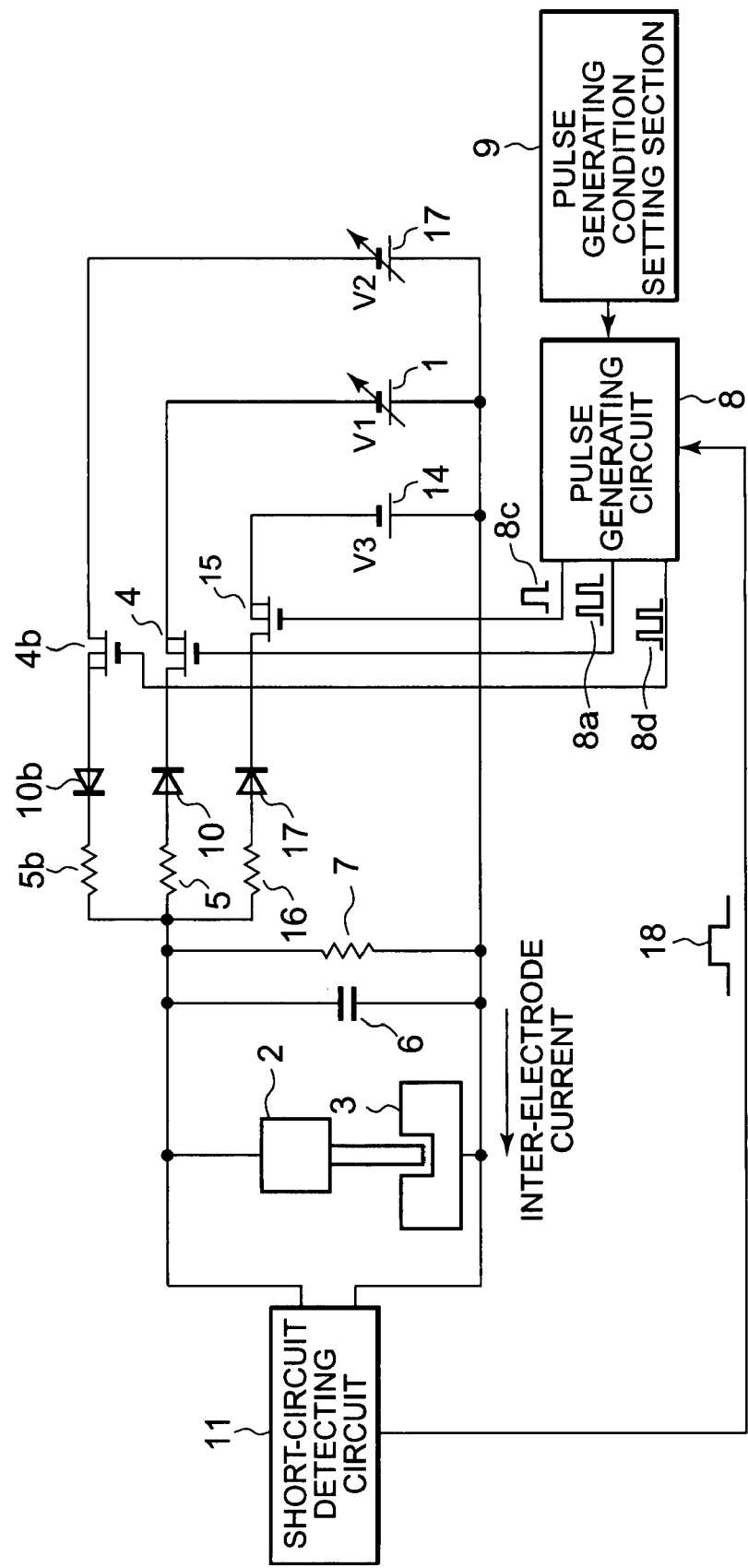
FIG. 11 is a configuration diagram of an electric-discharge-machining power supply apparatus explaining Embodiment 6.

FIG. 11 is a configuration diagram illustrating an example of Embodiment 6. In the present embodiment, the configuration is such that a series circuit consisting of a switching device 4b, a diode 10b, and a current-limiting resistor 5b is connected in parallel with a series circuit consisting of the switching device 4, the diode 10, and the current-limiting resistor 5.

Typically, based on instructions from the pulse generating condition setting section 9, the pulse generating circuit 8 can selectively generate both or either of the switching device driving signals 8a and 8d, to let both or either of the switching devices 4 and 4b operate selectively.

Therefore, the configuration is such that the magnitude of the pulse current supplied to the inter-electrode gap can be varied in accordance with machining contents such as the diameter size of the electrode or the machining status.

In addition, as in Embodiment 1, when detecting an inter-electrode short circuit, the short-circuit detecting circuit 11 generates and sends a short circuit detection signal 18 to the pulse generating circuit 8.

Figure 12:
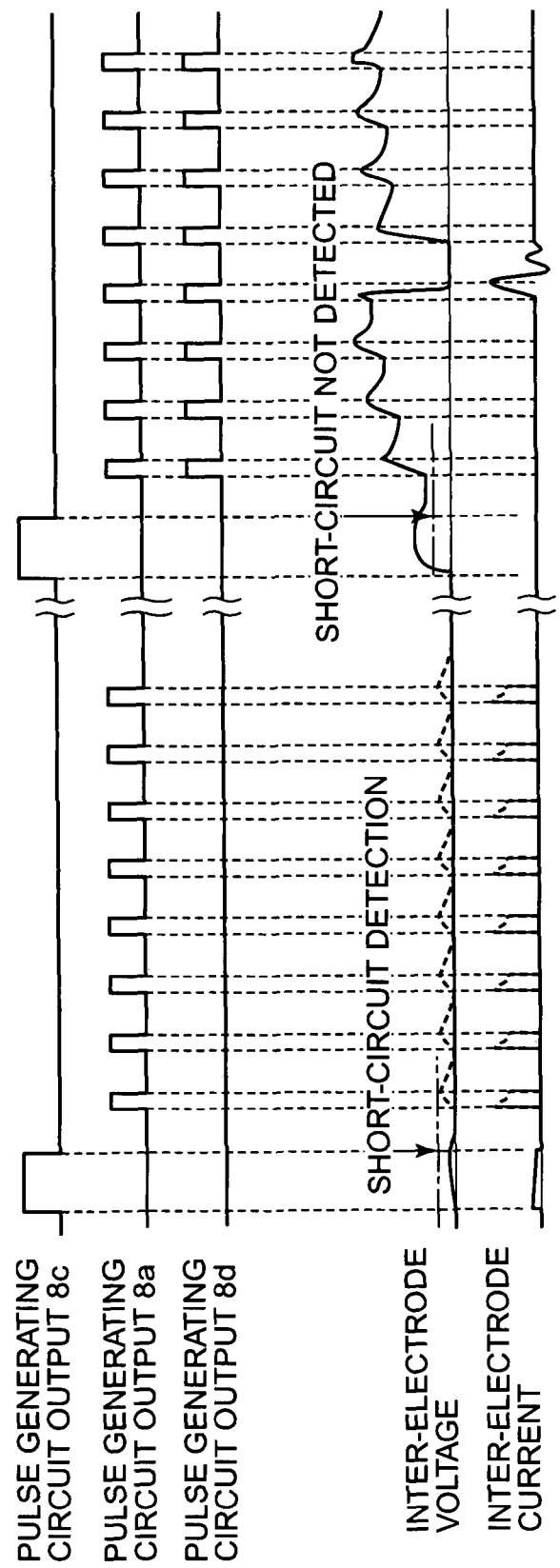
FIG. 12 is an operational timing chart for the configuration in FIG. 11.

Next, the circuit operation of FIG. 11 will be described in reference to FIG. 12.

When the inter-electrode gap is short-circuited, the short-circuit detecting circuit 11 detects the short circuit, and the short circuit detection signal 18 is inputted to the pulse generating circuit 8. When the short circuit detection signal 18 is inputted to the pulse generating circuit 8, in order to decrease the pulse current of the following pulse train, by halting the pulse generating circuit output 8d out of the pulse generating circuit outputs 8a and 8d, to let only the switching device 4 out of the switching devices 4 and 4b operate, the inter-electrode current value during short circuit occurrence is decreased. As an example, if the resistance values of the resistor 5 and the resistor 5b are configured to be in the relation 2:1, the current value during short circuit occurrence can be suppressed to one third.

According to the present embodiment, when the inter-electrode gap is short-circuited, there is a benefit in that, by decreasing the short-circuit current of each pulse, roughness of the machined surface and defects such as extraordinary wear or crack of the electrode can be prevented.

In addition, when the present circuit configuration is applied to a small-hole electric-discharge machining apparatus using a pipe electrode or a rod electrode, there are benefits in that such problems can be prevented that the machined surface gets rough due to continuous flow of the large short-circuit current, that the amount of electrode wear increases, that machining time gets long due to unstable machining, and that a minute electrode is glowing red hot or burned out.

Embodiment 7.

Figure 13:
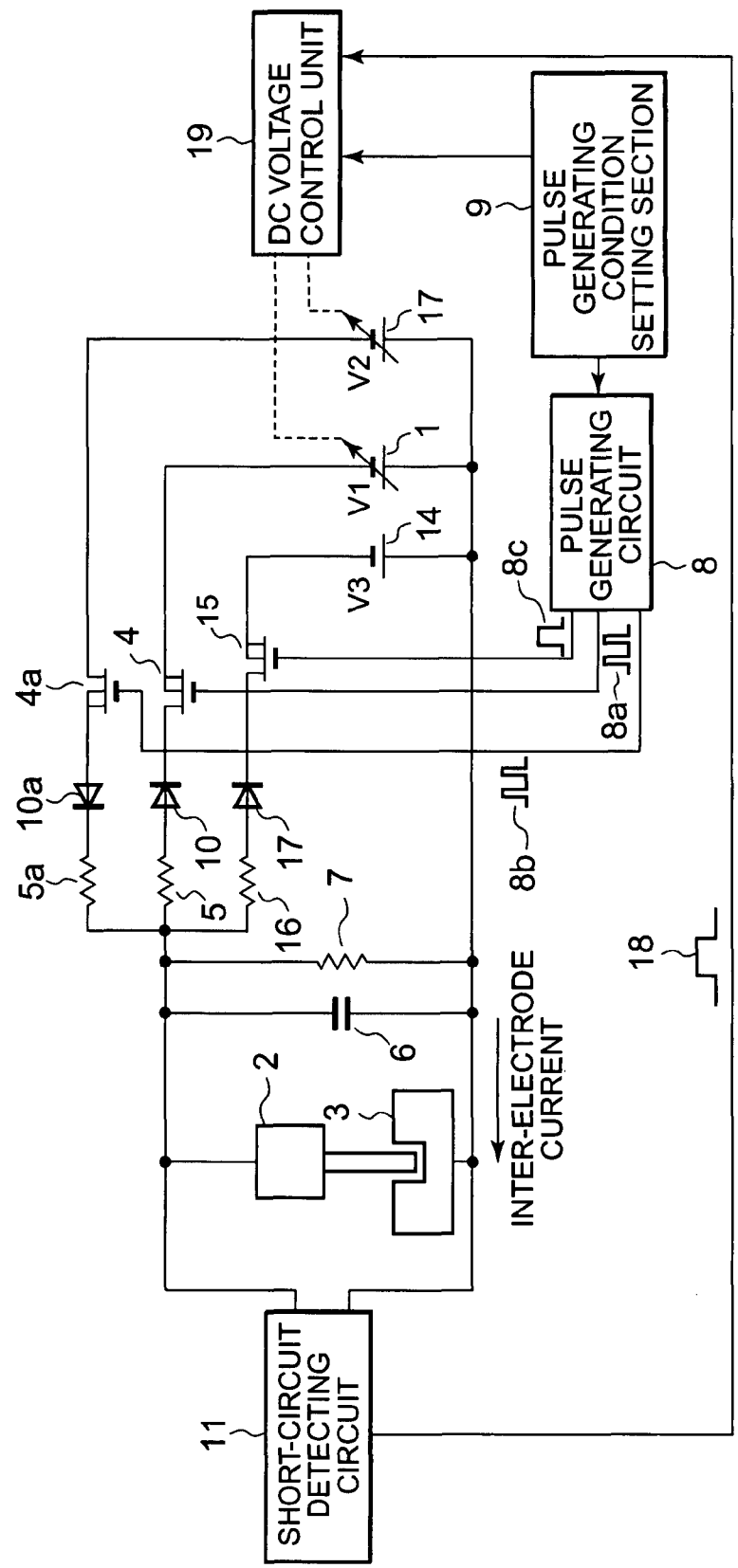
FIG. 13 is a configuration diagram of an electric-discharge-machining power supply apparatus explaining Embodiment 7.

An example of the configuration of the present embodiment is illustrated in FIG. 13.

In the present embodiment, the voltage V1 of the DC power supply 1 and the voltage V2 of the DC power supply 17 are typically controlled by a DC voltage control unit 19 based on instructions from the pulse generating condition setting section 9.

When the machining electrode 2 and the object 3 to be machined are short-circuited, the short-circuit detecting circuit 11 generates a short circuit detection signal 18, and sends the signal to the DC voltage control unit 19.

When receiving the short circuit detection signal 18, the DC voltage control unit 19 controls for a predetermined period of time around 0.1 msec to 10 msec the voltage V1 of the DC power supply 1 and the voltage V2 of the DC power supply 17 so as to be, for example, half of the designated voltages.

Therefore, when the inter-electrode gap is short-circuited, the short-circuit current flowing through the inter-electrode gap can be reduced to be half for a predetermined time after the short circuit occurrence.

According to the present embodiment, because, by reducing the DC power supply voltage for a predetermined period of time in short circuit occurrence, the short-circuit current flowing through the inter-electrode gap can be reduced for the predetermined period of time, there is a benefit in that roughness of the machined surface and defects such as extraordinary wear or crack of the electrode, generated by continuous flow of the large short-circuit current, can be prevented.

In addition, when the present circuit configuration is applied to a small-hole electric-discharge machining apparatus using a pipe electrode or a rod electrode, there are benefits in that such problems can be prevented that the machined surface gets rough, that the amount of electrode wear increases, that machining time gets long due to unstable machining, and that a minute electrode is glowing red hot or burned out.

INDUSTRIAL APPLICABILITY

The present invention is suitable to be applied to a small-hole electric-discharge machining apparatus.

What is claimed is:

1. An electric-discharge-machining power supply apparatus for machining an object to be machined by interrupting pulses during pulse trains that are turned on and off at predetermined timing, to supply electric power to a machining gap between a machining electrode and the object to be machined, the electric-discharge-machining power supply apparatus comprising:
a short circuit detecting means for detecting a short circuit at the machining gap between the machining electrode and the object to be machined during a pulse train; and
a pulse halting means for, when the short circuit detecting means detects a short circuit occurrence at the machining gap during the pulse train, generating at least one pulse in the pulse train after the pulse that generated the short circuit, and halting generation of a pulse subsequent to the generated at least one pulse so as to halt the power supply to the machining gap.

2. An electric-discharge-machining power supply apparatus according to claim 1, wherein the power supply to the machining gap is performed such that the pulse trains that are turned on and off at predetermined timing are interrupted every predetermined time period, and the polarity is inverted between positive and negative polarities alternately for each pulse train.

3. An electric-discharge-machining power supply apparatus according to claim 2, wherein the power supply to the machining gap is halted in a pair of positive and negative polarity pulse trains, one of which has the polarity when the short circuit is detected by the short circuit detecting means, and the other following one of which supplies electric power of an inverted polarity.

4. An electric-discharge-machining power supply apparatus according to claim 1, wherein the short circuit detecting means detects a short circuit when a particular pulse in the pulse train is applied.

5. An electric-discharge-machining power supply apparatus according to claim 4, wherein the short circuit detecting means detects a short circuit at the first pulse in the pulse train.

6. An electric-discharge-machining power supply apparatus according to claim 5, wherein, when the short circuit detecting means detects a short circuit, the electric power is supplied to the machining gap between a machining electrode and an object to be machined for at least one pulse in the pulse train, and the generation of another pulse is halted.

7. An electric-discharge-machining power supply apparatus according to claim 1, wherein the short circuit detecting means detects a short circuit by applying a short-circuit detecting pulse to the machining gap between the machining electrode and the object to be machined during downtime of pulse trains.

8. An electric-discharge-machining power supply apparatus according to claim 7, wherein the short-circuit detecting pulse is such that its voltage is lower than the voltage supplied by the pulse train, and its pulse width is longer than the electric discharge machining pulse.

9. The electric-discharge machining power supply apparatus of claim 1, wherein the pulse halting means halts the generation of another pulse every downtime period of the pulse train.

10. The electric-discharge machining power supply apparatus of claim 9, wherein the short circuit detecting circuit checks for a short circuit corresponding to each of the pulses of the pulse train.

11. The electric-discharge machining power supply apparatus of claim 9, wherein the pulse halting circuit halts the pulse train during a downtime period of the pulse train.

12. An electric-discharge-machining power supply apparatus according to claim 1, wherein the apparatus is used for a small-hole electric-discharge machining apparatus using a thin pipe or rod electrode as a machining electrode.

13. An electric discharge machining method in small-hole electric discharge machining for machining an object to be machined by interrupting pulses during pulse trains that are turned on and off at predetermined timing, to supply electric power to a machining gap between a thin pipe or rod machining electrode and the object to be machined, the method comprising:
a step of detecting a short circuit at the machining gap between the machining electrode and the object to be machined during a pulse train; and
a step of generating, when detecting a short circuit occurrence at the machining gap during the pulse train, at least one pulse in the pulse train and halting generation of a pulse subsequent to the generated at least one pulse so as to halt the power supply to the machining gap.

14. An electric discharge machining method according to claim 13, wherein the short circuit detection is performed when a particular pulse in the pulse train is applied.

15. An electric discharge machining method according to claim 14, wherein the short circuit detection is performed at the first pulse in the pulse train.

16. An electric discharge machining method according to claim 15, wherein, when the short circuit detecting means detects a short circuit, the electric power is supplied to the machining gap between a machining electrode and an object to be machined for at least one pulse in the pulse train, and the generation of another pulse is halted.

17. An electric discharge machining method according to claim 13, wherein the power supply to the machining gap is performed such that the pulse trains that are turned on and off at predetermined timing are interrupted every predetermined time period, and the polarity is inverted between positive and negative polarities alternately for each pulse train.

18. An electric discharge machining method according to claim 17, wherein, when a short circuit is detected, the power supply to the machining gap is halted in a pair of positive and negative polarity pulse trains, one of which has the polarity when detecting the short circuit, and the other following one of which supplies electric power of an inverted polarity.

19. An electric discharge machining method according to claim 13, wherein the short circuit detection is performed by applying a short-circuit detecting pulse to the machining gap between the machining electrode and the object to be machined during downtime of pulse trains.

20. An electric discharge machining method according to claim 19, wherein the short-circuit detecting pulse is such that its voltage is lower than the voltage supplied by the pulse train, and its pulse width is longer than the electric discharge machining pulse.

21. The electric-discharge machining method of claim 13, wherein the generation of the another pulse is halted every downtime period of the pulse train.

22. An electric-discharge-machining power supply apparatus for machining an object to be machined by interrupting pulses during pulse trains that are turned on and off at a predetermined timing, to supply electric power to a machining gap between a machining electrode and the object to be machined, the electric-discharge-machining power supply apparatus comprising:

a short circuit detecting means for detecting a short circuit at the machining gap between the machining electrode and the object to be machined during a downtime between pulse trains; and a pulse halting means for, when the short circuit detecting means detects a short circuit occurrence at the machining gap during the downtime, generating at least one pulse in a pulse train next to the downtime and halting generation of a pulse subsequent to the generated at least one pulse so as to halt the power supply to the machining gap.

23. An electric-discharge-machining power supply apparatus according to claim 22, further comprising:

a pulse generating condition setting means for manually setting a number of pulses to be generated in the pulse train subsequent to the downtime in which the short circuit is detected.

* * * * *